(12) United States Patent
Stare et al.

(10) Patent No.: US 12,457,521 B2
(45) Date of Patent: Oct. 28, 2025

(54) NETWORK NODE, DEVICE AND METHODS IN A TELECOMMUNICATION NETWORK

(71) Applicant: Telefonaktiebolaget LM Ericsson (publ), Stockholm (SE)

(72) Inventors: Erik Stare, Sollentuna (SE); Martin Van Der Zee, Malmö (SE); Dung Pham Van, Upplands Väsby (SE); Joakim Åkesson, Hovås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 386 days.

(21) Appl. No.: 18/029,263

(22) PCT Filed: Oct. 22, 2021

(86) PCT No.: PCT/EP2021/079408
§ 371 (c)(1),
(2) Date: Mar. 29, 2023

(87) PCT Pub. No.: WO2022/084537
PCT Pub. Date: Apr. 28, 2022

(65) Prior Publication Data
US 2023/0370893 A1    Nov. 16, 2023

(30) Foreign Application Priority Data
Oct. 23, 2020  (EP) .................................... 20203481

(51) Int. Cl.
*H04W 28/02* (2009.01)
*H04W 28/08* (2023.01)
(Continued)

(52) U.S. Cl.
CPC ... *H04W 28/0289* (2013.01); *H04W 28/0284* (2013.01); *H04W 28/0831* (2020.05); *H04W 76/27* (2018.02); *H04W 76/34* (2018.02)

(58) Field of Classification Search
CPC ......... H04W 28/0289; H04W 28/0284; H04W 28/0831; H04W 76/27; H04W 76/34; H04W 28/0875
See application file for complete search history.

(56) References Cited

U.S. PATENT DOCUMENTS

2013/0090115 A1   4/2013   Deivasignamani et al.
2021/0352555 A1 * 11/2021   Fujishiro ............... H04W 48/00

FOREIGN PATENT DOCUMENTS

WO    2019161927 A1    8/2019

OTHER PUBLICATIONS

International Search Report and Written Opinion of the International Searching Authority, PCT/EP2021/079408, mailed Feb. 9, 2022, 11 pages.
(Continued)

*Primary Examiner* — Ashley Shivers
(74) *Attorney, Agent, or Firm* — Sage Patent Group

(57) ABSTRACT

Embodiments herein relate to a method performed by a network node in a telecommunication network providing a multicast transmission to a group of devices residing in a cell of the telecommunication network. The network node monitors a congestion level for communication, and, if the congestion level reaches a first threshold, the network node orders for at least one device in a RRC connected mode to be released from the RRC connected mode to an RRC idle mode or an RRC inactive mode, thereby disabling a capability of the at least one device to provide one or more re-transmission requests while keeping an ability of the at least one device to further receive the multicast transmission.

26 Claims, 17 Drawing Sheets

(51) Int. Cl.
    *H04W 76/27* (2018.01)
    *H04W 76/34* (2018.01)

(56) References Cited

OTHER PUBLICATIONS

AT&T, "Handling large number of UEs in a cell for K1 #3 in 23.774," 3GPP TSG-SA6 Meeting #34, S6-192057, Reno, Nevada, USA, Nov. 11-15, 2019, 2 pages.

Ericsson, "Support for NR multicast reception in RRC Inactive/Idle," 3GPP TSG-RAN WG1 Meeting #103-e, R1-2009307, e-Meeting, Oct. 26-Nov. 13, 2020, 4 pages.

International Preliminary Report on Patentability of the International Preliminary Examining Authority, PCDT/EP2021/079408, mailed Mar. 16, 2023, 15 pages.

Office Action, Japanese Patent Application No. 2023-524673, mailed Apr. 23, 2024, 7 pages.

Ericsson, MBS reception in Idle and Inactive mode, 3GPP TSG RAN WG2 #112-e R2-2009953, Internet<URL:https://www.3gpp.org/ftp/tsg_ran/WG2_RL2/TSGR2_112-e/Docs/R2-2009953.zip>, Oct. 23, 2020, section 3.5, 11 pages.

Ericsson, Basic functions for broadcast/multicast for RRC_IDLE/RRC_INACTIVE UEs, 3GPP TSG RAN WG1 #102-e R1-2006920, Internet<URL:https://www.3gpp.org/ftp/tsg_ran/WG1_RL1/TSGR1_102-e/Docs/R1-2006920.zip>, Aug. 17, 2020, 5 pages.

\* cited by examiner

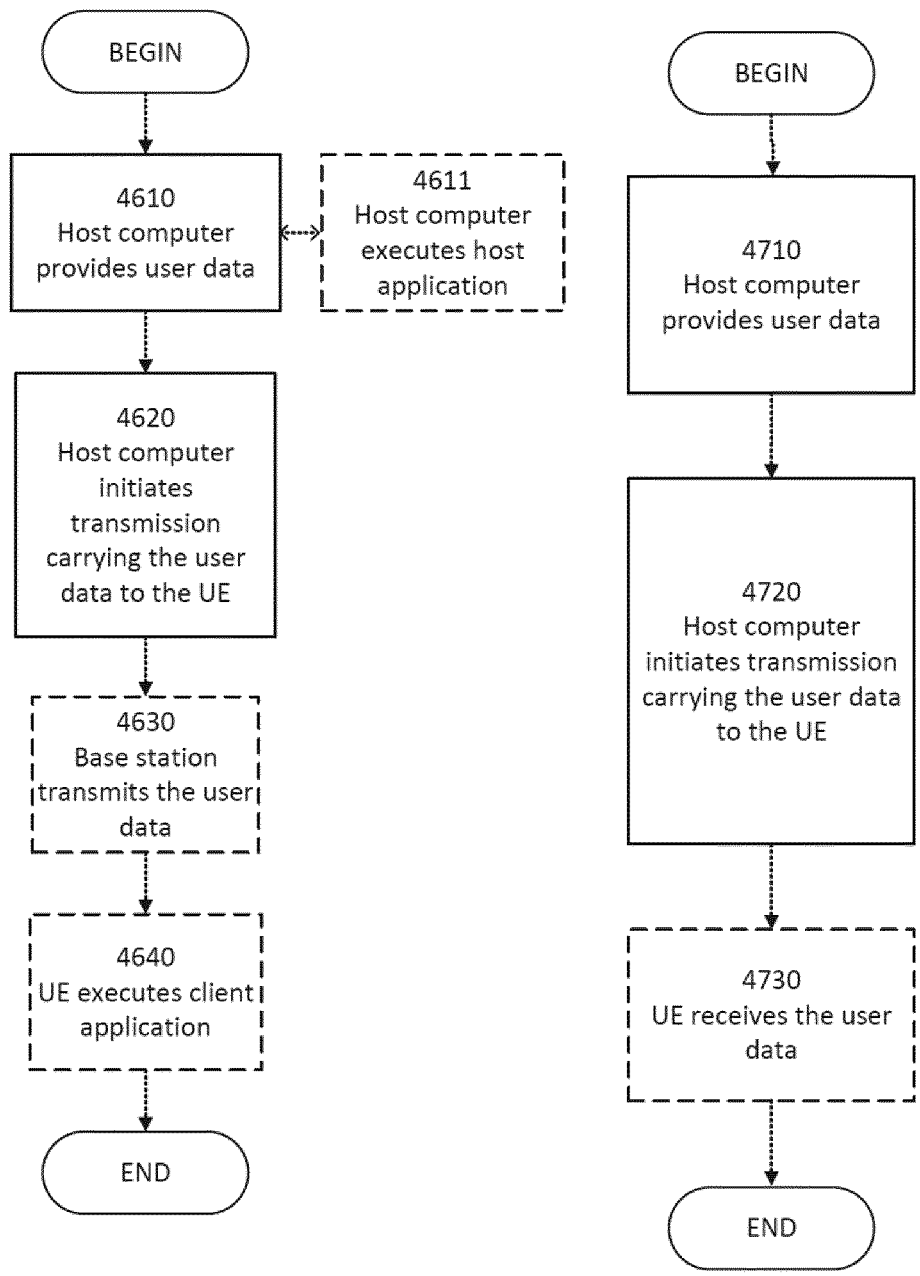

NETWORK NODE, DEVICE AND METHODS IN A TELECOMMUNICATION NETWORK

CROSS REFERENCE TO RELATED APPLICATIONS

This application is a 35 U.S.C. § 371 national stage application of PCT International Application No. PCT/EP2021/079408 filed on Oct. 22, 2021, which in turn claims foreign priority to European Patent Application No. 20203481.5, filed on Oct. 23, 2020, the disclosures and content of which are incorporated by reference herein in their entirety.

TECHNICAL FIELD

The present disclosure relates generally to communications, and more particularly to communication methods and related nodes for multicast transmission to devices. Embodiments herein relate to a network node, a device and methods performed therein regarding wireless communication.

BACKGROUND

The fifth generation mobile wireless communication system (5G) or new radio (NR) has been specified in 3GPP. It includes two releases up to now, release (R)-15 and R-16. Only unicast transmission is supported. Since multicast and broadcast transmission is very useful for some applications, e.g. Network Security Public Safety (NSPS), vehicle to everything (V2X) etc, a new work item (WI) is agreed to study broadcast/multicast transmission in R-17 for NR.

With user equipments (UE), also referred herein as devices, in radio resource control (RRC) Connected state receiving multicast the network may guarantee a quality of service (QoS) and at the same time achieve a high efficiency in the use of radio resources in downlink (DL). With increasing number of UEs there may however be congestion issues.

In some use case scenarios, such as e.g. Public Safety, there may be a very large number of users within a cell in connected mode. Many of these may need to simultaneously e.g. use Mission Critical Push to Talk (MCPTT) in large group calls, which may involve both voice and video.

The use of Point-to-Multipoint (PTM)-based functionality, where the same downlink signal may reach many UEs, will no doubt help a lot in such cases and increase the total number of UEs that can receive a multimedia broadcast service (MBS) in a cell with required QoS, compared to a legacy unicast-only approach.

Although the use of multicast in RRC Connected mode is likely to be adequate in most situations and scenarios it may still happen that congestion occurs where the number of UEs exceed a level where the network can no longer support all UEs with the required QoS. In many cases it is expected that the uplink (UL) in unicast may be the limiting factor in such cases, where there is not enough UL capacity to support UE feedback from all RRC Connected UEs.

The network will then have to lower the actual QoS or block some UEs from the service. Neither of these may be acceptable in e.g. a Mission Critical Push-to-Talk (MCPTT) for Public Safety and the performance of the telecommunication network will be reduced or limited.

SUMMARY

An object of embodiments herein is to provide a mechanism that improves the performance in a telecommunication network.

According to embodiments herein the object is achieved by providing a method performed by a network node, such as radio network node, in a telecommunication network providing a multicast transmission to a group of devices, for example, UEs, residing in a cell of the telecommunication network. The network node monitors a congestion level for communication. The network node, if the congestion level reaches a first threshold, orders for at least one device in a RRC connected mode to be released from the RRC connected mode to an RRC idle mode or an RRC inactive mode, thereby disabling a capability of the at least one device to provide one or more re-transmission requests while keeping an ability of the at least one device to further receive the multicast transmission.

According to embodiments herein the object may also be achieved by providing a method performed by a device, where the device is one device out of a group of devices residing in a cell of a telecommunication network, wherein the group of devices is receiving a multicast transmission, and the device is in a RRC connected mode. The device receives an order to be released to an RRC idle mode or an RRC inactive mode. The device further maintains a configuration for receiving the multicast transmission, and continues to receive the multicast transmission in the RRC idle mode or the RRC inactive mode.

According to embodiments herein the object may also be achieved by providing a device, wherein the device is configured to, when the device is in a RRC connected mode, receive an order to be released to an RRC idle mode or an RRC inactive mode. The device is further configured to maintain a configuration for receiving the multicast transmission, and to continue to receive the multicast transmission in the RRC idle mode or the RRC inactive mode.

According to embodiments herein the object may also be achieved by providing a network node, such as radio network node, for, in a telecommunication network, providing a multicast transmission to a group of devices, for example, UEs, residing in a cell of the telecommunication network. The network node is configured to monitor a congestion level for communication. The network node is further configured to, if the congestion level reaches a first threshold, order for at least one device in a RRC connected mode to be released from the RRC connected mode to an RRC idle mode or an RRC inactive mode, thereby disabling a capability of the at least one device to provide one or more re-transmission requests while keeping an ability of the at least one device to further receive the multicast transmission.

Thus, it is herein provided a function in the telecommunication network providing a multicast transmission to a group of devices residing in a cell of the telecommunication network. The function monitors the congestion level for communication, e.g. uplink communication, and if the congestion level reaches a first threshold the function orders for at least one device in the RRC connected mode to be released, also herein referred to as being switched, from the RRC connected mode to the RRC idle or inactive mode, thereby disabling the device capabilities to provide retransmissions requests, also referred to as uplink re-transmission requests, while keeping the device ability to further receive the multicast transmission. Uplink retransmission requests herein meaning requests sent in the uplink.

For the congestion case, with too many devices that wish to receive the MBS service, the network can keep QoS for RRC Connected devices up to some limit but still allow remaining devices to receive the service, albeit with a reduced QoS.

The proposed solution also allows the total number of devices, that receive according to the QoS target, to be higher than with all devices in RRC Connected mode only.

In a further embodiment said function, when the congestion level reaches a second threshold, lower than said first threshold, orders to return said at least one device, previously switched to the RRC Inactive/idle mode, back to the RRC connected mode.

In a further embodiment said function orders re-transmissions without requests for retransmissions if at least one device has been switched from the RRC connect mode to the RRC idle mode.

In a further embodiment the telecommunication network provides said multicast transmission as if said at least one device in RRC idle mode was in RRC connected mode In a further embodiment said at least one device is ordered to be released to RRC inactive instead of RRC idle. This has the advantage that the load on the network nodes to maintain the idle device configuration is lowered as they need not to be maintained for inactive.

In a further embodiment the network provides to said group of devices a special RRC configuration allowing the devices to keep receiving the multicast stream but disables re-transmission requests.

In a further embodiment said special RRC configuration comprises a condition that allows a device of said group to return to RRC connect when said condition is met. This may release the function of checking a second threshold and returning devices back to RRC-connected mode. The device checks the condition and if reception quality is below a threshold the device returns or switches back to RRC connect mode. This is especially advantageous for devices in inactive mode as the network will not be aware of deterioration of reception.

In a further embodiment said device ordered to be released to RRC idle or RRC inactive mode is the one device of the group that has the best reception reported. This device has the best opportunities to keep receiving the multicast transmission in good QoS even when in RRC idle or inactive mode.

In a further embodiment the ordering to release to RRC idle mode or RRC inactive mode and back to RRC connected mode is rotated amongst a number of devices of said group having comparable reception reported. This provides a fair scheduling of devices with comparable reception to share the burden of being in RRC idle or inactive mode.

In a further aspect some embodiments relate to a device, where the device is one of a group of devices residing in a cell of a telecommunication network where the group receives a multicast transmission. While the device is in the RRC connected mode it receives an order to be released to the RRC idle mode or inactive mode. The device maintains the configuration of the multicast transmission and continues to receive the multicast transmission.

In a further embodiment the device, when it is no longer interested in the multicast transmission uses a random access procedure to indicate this to the telecommunication network.

In a further embodiment the device receives an order to be released to RRC inactive mode instead of RRC idle mode.

In a further embodiment the device receives a special RRC configuration from the telecommunication network arranging the continuation of reception of the multicast transmission when switched to RRC idle or RRC inactive.

In a further embodiment the special RRC configuration further comprises a condition, and when that condition is met by the device and the device is in RRC idle or RRC inactive mode, the device is allowed to return back to RRC connected mode.

Thus, embodiments herein allow the total number of devices, that receive according to a QoS target, to be higher than when all devices are in RRC Connected mode only since one or more devices are ordered into inactive or idle mode. This will lead to an improved performance of the telecommunication network.

BRIEF DESCRIPTION OF THE DRAWINGS

The accompanying drawings, which are included to provide a further understanding of the disclosure and are incorporated in and constitute a part of this application, illustrate certain non-limiting embodiments of the present disclosure. In the drawings:

FIG. 16 is a block diagram of methods implemented in a communication system including a host computer, a base station and a user equipment in accordance with some embodiments;

FIG. 17 is a block diagram of methods implemented in a communication system including a host computer, a base station and a user equipment in accordance with some embodiments;

DETAILED DESCRIPTION

Figure 1:
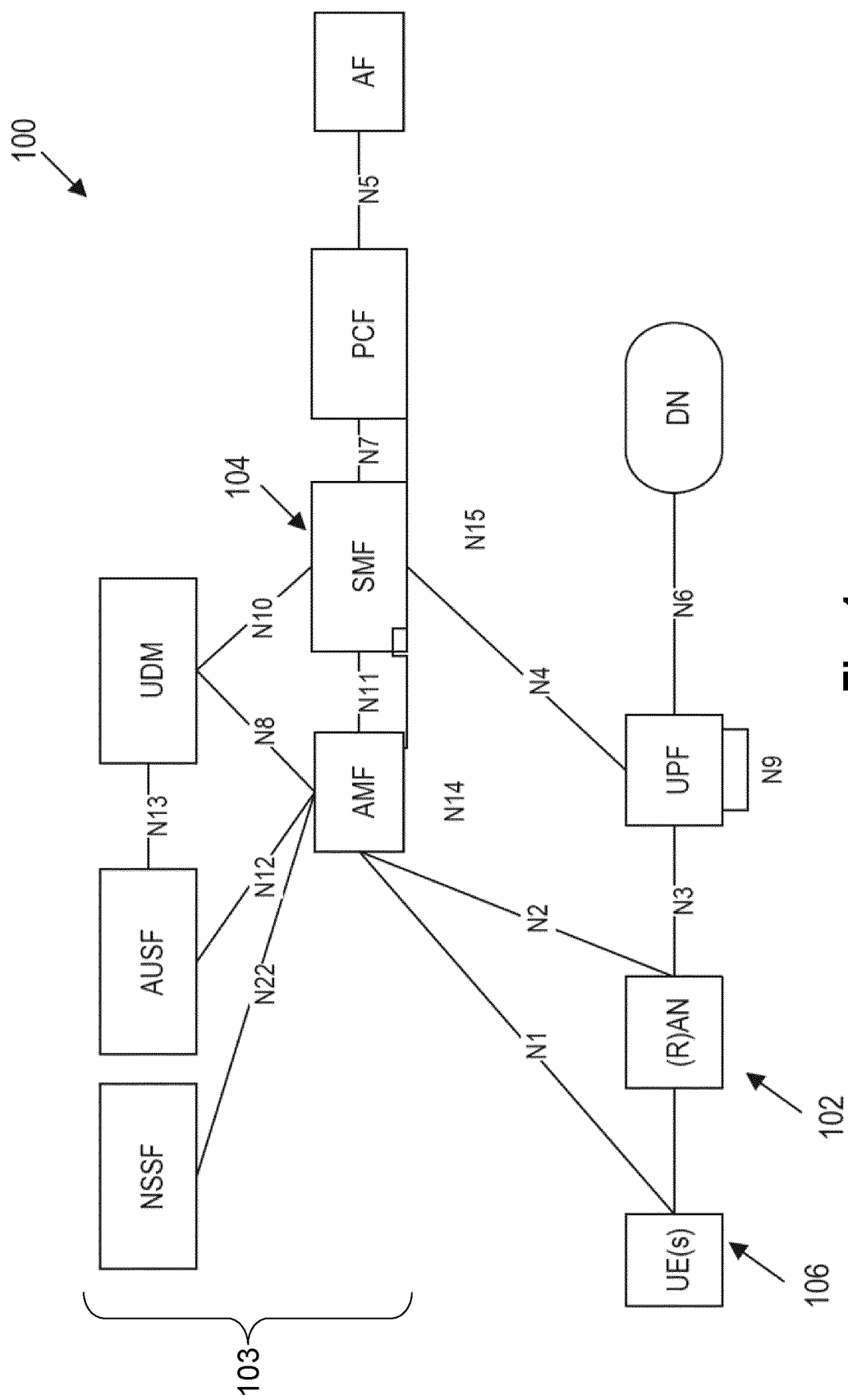
FIG. 1 is a block diagram illustrating an example of a telecommunication network representing 5th Generation Wireless System (5G) network architecture including a network node and core network functions (NFs)

Concepts will now be described more fully hereinafter with reference to the accompanying drawings, in which examples of embodiments of concepts are shown. The concepts may, however, be embodied in many different forms and should not be construed as limited to the embodiments set forth herein. Rather, these embodiments are provided so that this disclosure will be thorough and complete, and will fully convey the scope of present concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the matter set by the claims.

Although the use of multicast with Point-To-Multipoint (PTM) functionality may support many devices also referred to as user equipments (UE) in a cell with required QoS, with increasing number of UEs there will at some point be congestion, e.g. in the uplink, due to UEs sending hybrid automatic repeat request (HARQ) feedback or to keep the UE context of all the connected mode UEs. UE's may use the HARQ feedback to initiate retransmissions.

A subset of UEs may be released from RRC Connected mode to RRC Inactive mode or RRC Idle mode. The same single multicast transmission may still be received by UEs in all RRC states. QoS can thus be maintained for RRC Connected UEs, whereas some UEs in RRC Inactive/Idle mode may experience a QoS below the normal QoS threshold as they cannot request re-transmissions, but this may be preferred compared to not receiving at all for these UEs if they are instead blocked from RRC Connected mode without the reception possibility in RRC Idle or Inactive mode.

The network may also move UEs between RRC Connected mode and RRC Inactive/Idle mode in a dynamic way, so that UEs with the best link quality for the moment will tend to be moved to RRC Inactive/Idle mode, whereas UEs in worse conditions are in RRC Connected mode. When UE link quality in RRC Inactive/Idle mode passes a threshold the UE may go back to RRC Connected mode.

Through the multicast the network may so efficiently inform RRC Idle/Inactive UEs about the session update such as session stop, service area change, configuration modification, or change in security.

The UE in RRC Idle/Inactive mode may further efficiently inform network when it no longer receives an MBS session.

As used herein, network node or network function (e.g., first network node and/or network node) refers to equipment capable, configured, arranged and/or operable to communicate directly or indirectly with a user equipment and/or with other devices such as network nodes or equipment in the telecommunication network (e.g., a radio communication network) to enable and/or provide wireless access to the user equipment and/or to perform other functions (e.g., administration) in the radio communication network. Examples of network nodes include, but are not limited to, base stations (BSs) (e.g., radio base stations, Node Bs, evolved Node Bs (eNBs), NG-RAN node, gNode Bs (including, e.g., a of a gNode B (gNB), etc.). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes, e.g., mobile switching centers (MSC), mobility management entities (MME), O&M nodes, operation support system (OSS) nodes, self organizing network (SON) nodes, positioning nodes, e.g., evolved Serving Mobile Location Centers (E-SMLC), and/or minimization drive tests (MDT). As another example, the network node may be a virtual network node.

As used herein, core network node, e.g., an session management function (SMF) node, refers to equipment capable, configured, arranged and/or operable to communicate directly or indirectly with a network node, e.g., a first network node, and/or with other core network nodes or equipment in the telecommunication network, e.g., a radio communication network, to enable and/or provide wireless access to the user equipment and/or to perform other functions, e.g., administration, in the radio communication network. Examples of core network nodes include, but are not limited to, an SMF node, an Access and Mobility Management function (AMF) node, a Policy Control Function (PCF) node, and an Application function (AF) node.

FIG. 1 depicts an example of a telecommunication network 100 represented as a 5G network architecture composed of core network functions (NFs) nodes, where interaction between any two NF nodes is represented by a point-to-point reference point/interface.

Seen from the access side, the 5G network architecture shown in FIG. 1 includes a plurality of User Equipment (UEs) 106 connected to either a Radio Access Network (RAN) or an Access Network (AN) by a wireless interface as well as an AMF. Typically, the RAN comprises base stations 102, such as evolved Node Bs (eNBs) or 5G base stations (gNBs) or similar. Seen from the core network side, the 5G core NF nodes 103 shown in FIG. 1 include a Network Slice Selection Function (NSSF) node, an Authentication Server Function (AUSF) node, a Unified Data Management (UDM) node, an AMF node, an SMF node 104, a PCF node, and an AF node.

Figure 2:
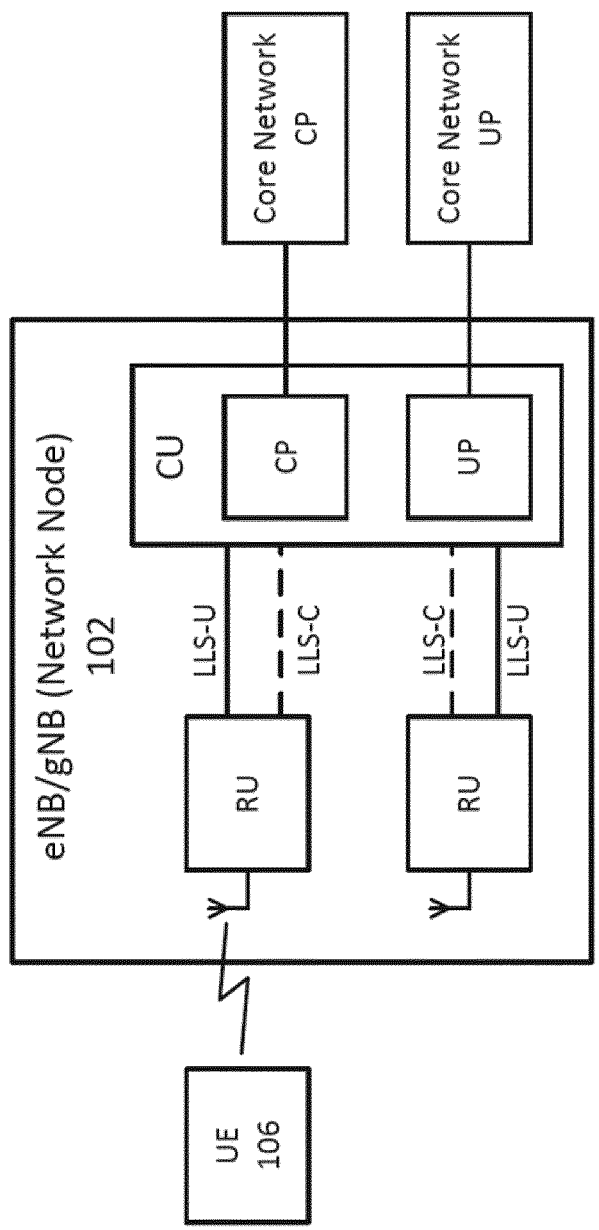
FIG. 2 is a block diagram illustrating an example of a network node including a split central unit and a radio unit according to some embodiments.

FIG. 2 depicts an example of a network node 102 according to some embodiments. As illustrated in FIG. 2, the network node 102 may comprise an eNB or a gNB with a split central unit (CU) and on or more radio units (RU) connected to the CU. The CU is capable of interacting with the RU(s) over the C control plane(s) and/or the U user plane(s) on the so-called "fronthaul." As illustrated, the CU is a logical node that includes the eNB/gNB functions as discussed below. In this regard, the CU controls the operation of the RU(s) in some embodiments discussed herein. The CU communicates with the control plane (CP) and user plane (UP) functions of a core network on the backhaul. The RUs transmit and receive downlink and uplink data, respectively, to/from one or more UEs 106 via a wireless interface.

Figure 3A:
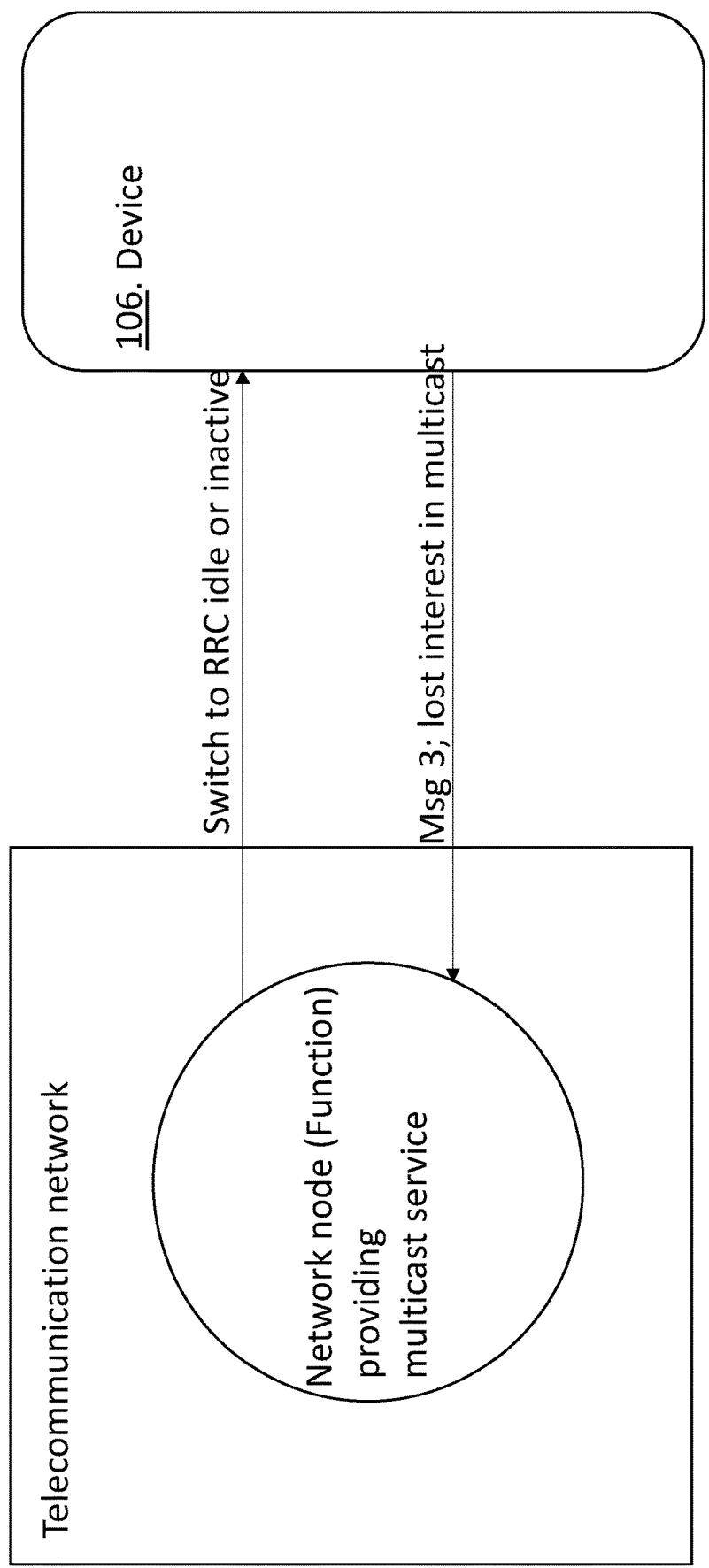
FIG. 3a is a signal flow diagram illustrating an example of operations in a telecommunication network according to some embodiments.

FIG. 3a depicts exemplary signals between the multicast providing function and devices, also referred to as UEs herein. The depicted signals are on the higher functional level. It might be clear that the above described elements actually perform the signal being transported.

Figure 3B:
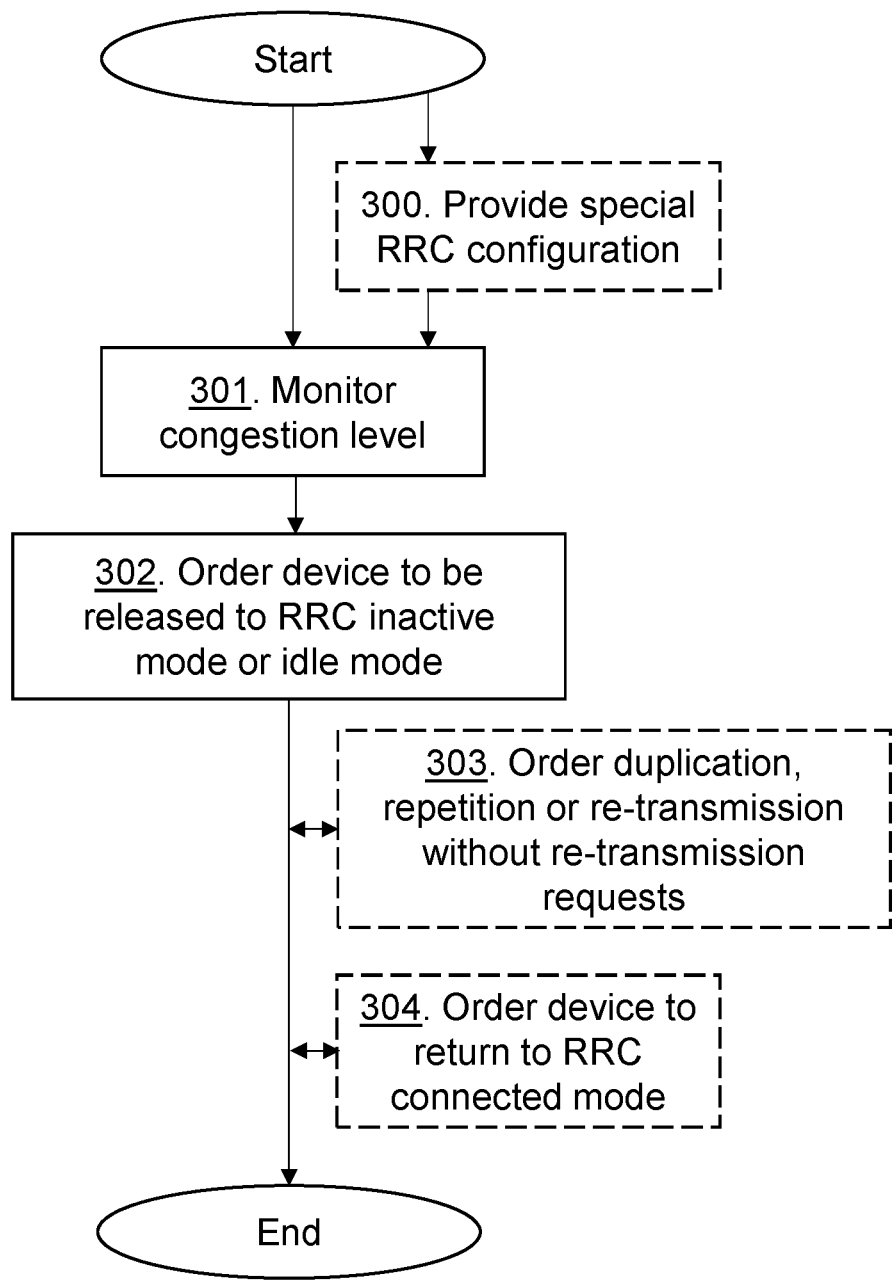
FIG. 3b shows a flowchart illustrating a method performed by a network node according to embodiments herein.

Thus, it is herein provided a method, see FIG. 3b, performed by a network node such as a radio base station, in the telecommunication network providing a multicast transmission to a group of devices residing in a cell of the telecommunication network.

Action 300. The network node may provide to said group of devices a special RRC configuration allowing said group of devices to keep receiving said multicast transmission but disabling re-transmission requests. The special RRC configuration may comprise a condition, e.g., a UE based condition, that allows a device of said group of devices to return to the RRC connected mode when said condition is met. The condition may be related to link quality of the at least one device.

Action 301. The network node monitors a congestion level for communication, for example, for upink communication.

Action 302. The network node, if the congestion level reaches a first threshold, orders for at least one device in a RRC connected mode to be released from the RRC connected mode to an RRC idle mode or an RRC inactive mode, thereby disabling a capability of the at least one device to provide one or more re-transmission requests while keeping an ability of the at least one device to further receive the multicast transmission. Said at least one device ordered to be released to the RRC idle mode or the RRC inactive mode may be selected based on reception quality. The network node may rotate the ordering to be released to the RRC idle mode or the RRC inactive mode and back to the RRC connected mode amongst a number of devices of said group of devices having comparable reception reported.

Action 303. The network node may order one or more duplications, repetitions or re-transmissions without re-transmission requests if at least one device has been released from an RRC connected mode to an RRC idle mode, or an RRC inactive mode.

Action 304. The network node may, when the congestion level reaches a second threshold, lower than said first threshold, order to return said at least one device from the RRC idle mode, or the RRC inactive mode, back to the RRC connected mode.

Figure 3C:
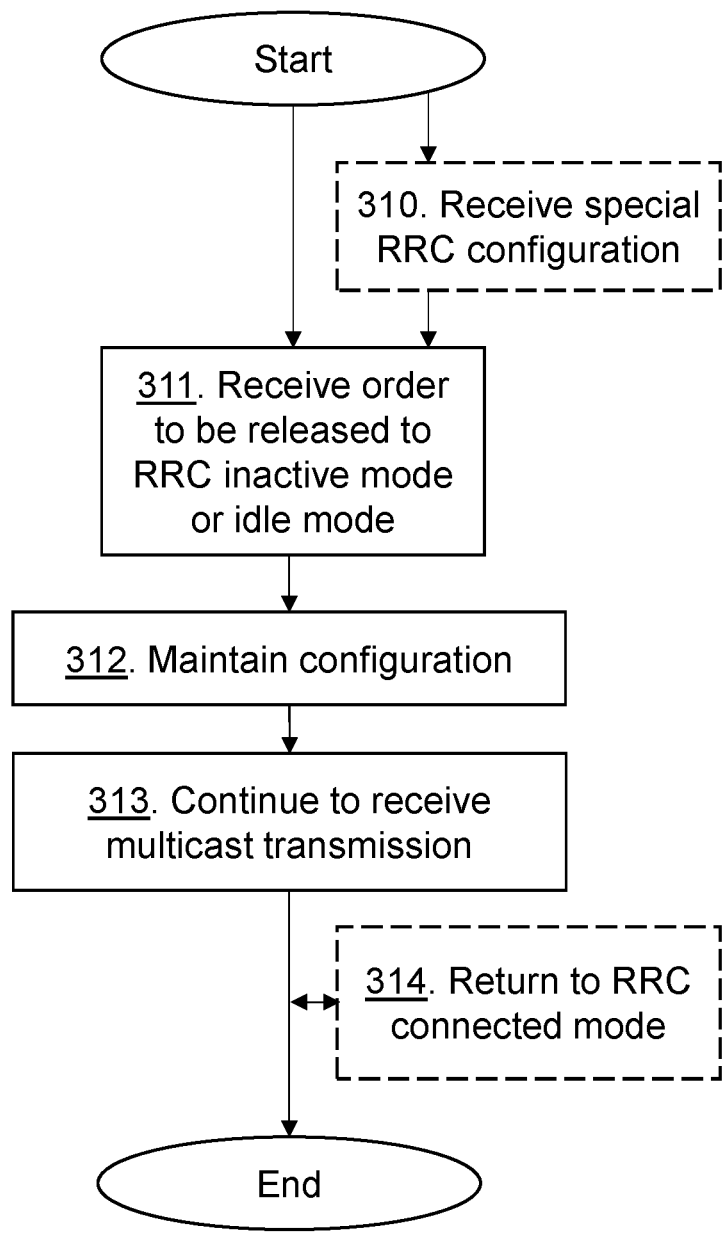
FIG. 3c shows a flowchart illustrating a method performed by a device according to embodiments herein.

Furthermore, it is herein provided a method, see FIG. 3c, performed by the device 106, where the device 106 is one device out of a group of devices residing in a cell of a telecommunication network, wherein the group of devices is receiving a multicast transmission, and the device is in a RRC connected mode.

Action 310. The device 106 may receive the special RRC configuration from the telecommunication network arranging the continuation of reception of the multicast transmission but disabling re-transmission requests when released to the RRC idle mode or the RRC inactive mode. The special RRC configuration may further comprise the condition, and when the condition is met by the device and the device is in the RRC idle mode or the RRC inactive mode, the device 106 is allowed to return to the RRC connected mode. The condition may be related to link quality of the device.

Action 311. The device 106 receives an order to be released to an RRC idle mode or an RRC inactive mode.

Action 312. The device 106 maintains a configuration for receiving the multicast transmission.

Action 313. The device 106 continues to receive the multicast transmission in the RRC idle mode or the RRC inactive mode. The device 106 may use a random access procedure to indicate to the telecommunication network that the device is no longer interested in the multicast transmission.

Action 314. The device 106 may return to connected mode during a cell change (or when condition is met).

Figure 4:
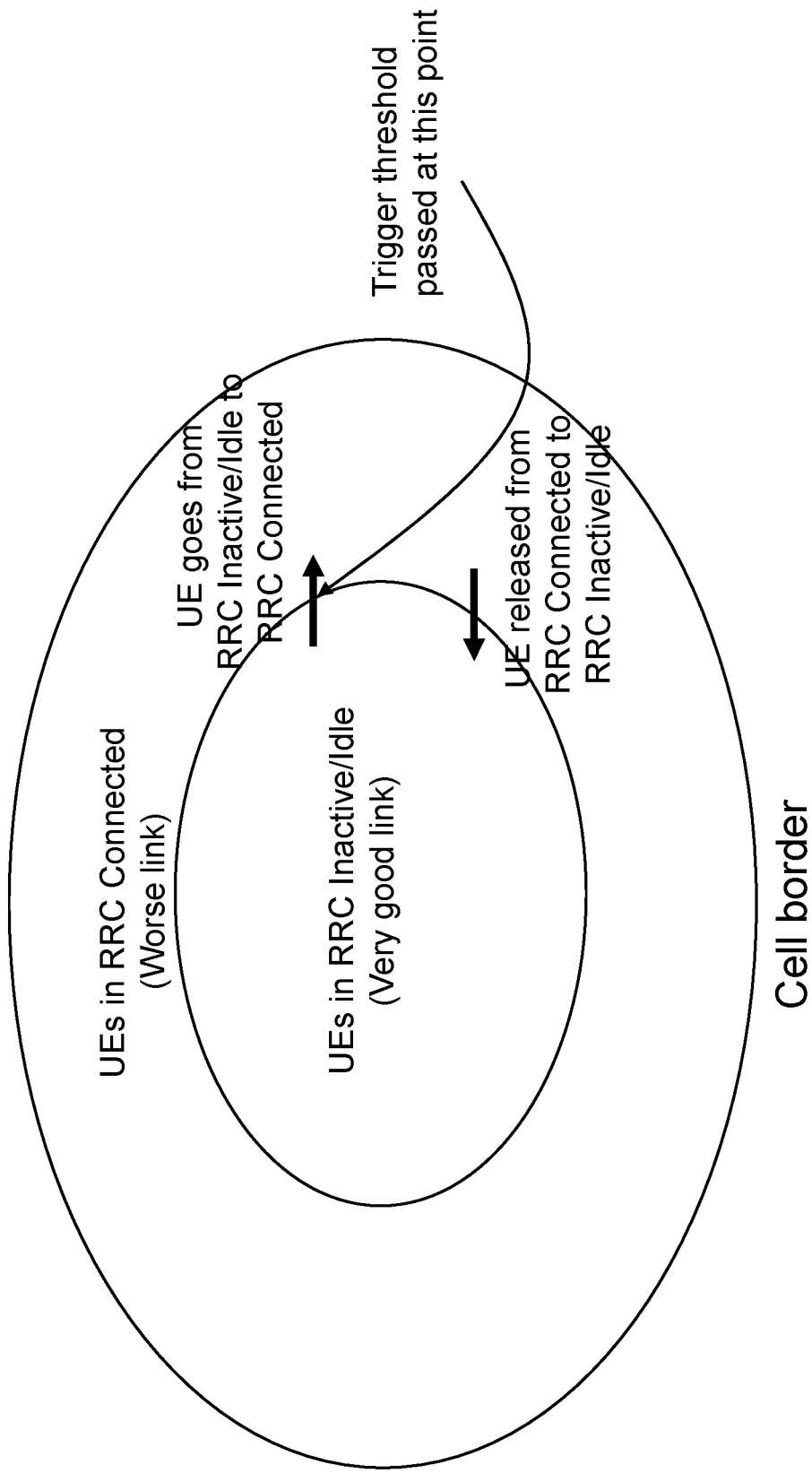
FIG. 4 is an illustrative diagram of the method performed by the network function and the devices according to some embodiments.

FIG. 4 provides a high-level illustration of the methods performed by the network function and devices. It illustrates that devices (or UE's) 106 which have a good reception will not need many re-transmission requests to maintain a high QoS level. Putting them in Idle or inactive mode and enable them to still receive the multicast saves considerable in the HARQ feedback and so solves potential congestion in the uplink.

Figure 5:
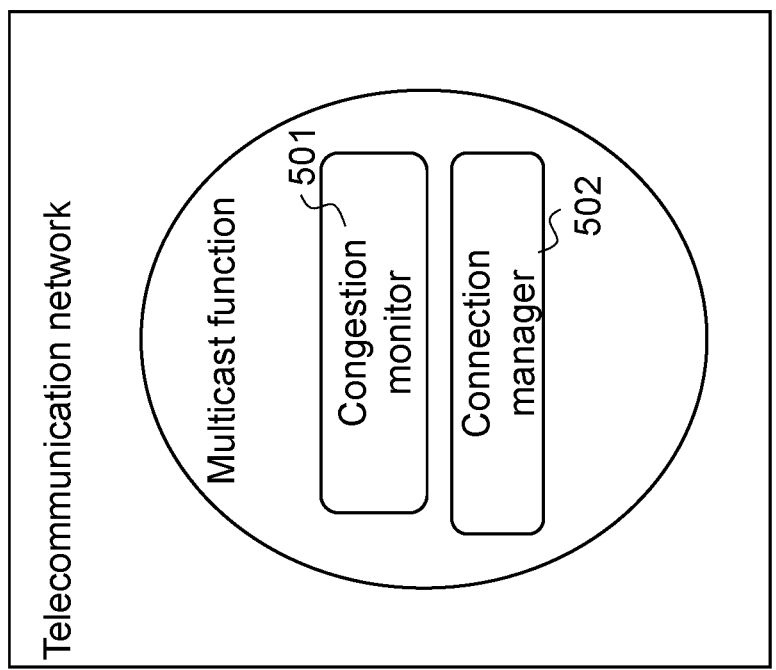
FIG. 5 is a block diagram illustrating an example of a network function according to some embodiments.

FIG. 5 is a block diagram illustrating elements of the multicast function in the telecommunication network according to embodiments herein. The network function comprises a congestion monitor 501 that weights load of communication such as on the uplink with a resulting QoS that can be provided. The output of the congestion monitor is provided to a connection manager 502. This connection manager 502 compares the input received, i.e., the weighted load from the congestion monitor 501, to a threshold. If the threshold is reached the connection manager 502 starts ordering one or more RRC connected devices into the RRC idle mode or the RRC inactive mode until the situation has improved. That is, until the weighted load has decreased.

Figure 6:
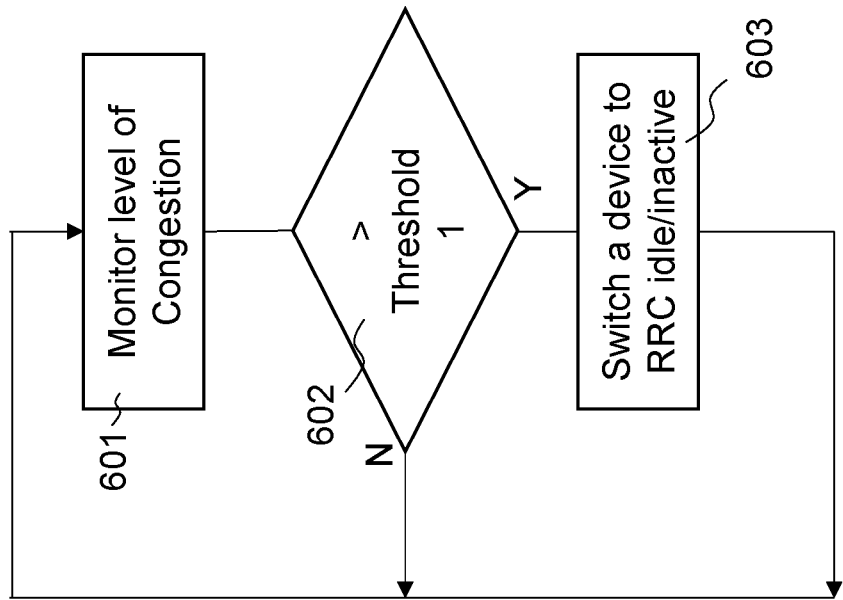
FIG. 6-8 are flow charts illustrating examples of operations of a network function according to some embodiments of the present disclosure.

FIG. 6 illustrates a flow diagram of the operations of the network function. In a continuous loop the congestion situations are monitored against a stated or predefined QoS for the multicast, see action 601. That value is checked in a next step, see action 602, and when the threshold is reached, or passed, one or more devices are released to the RRC idle or inactive mode, see action 603. The load is the continuously monitored and when the values is below the threshold no action is taken and again congestion is monitored.

Figure 7:
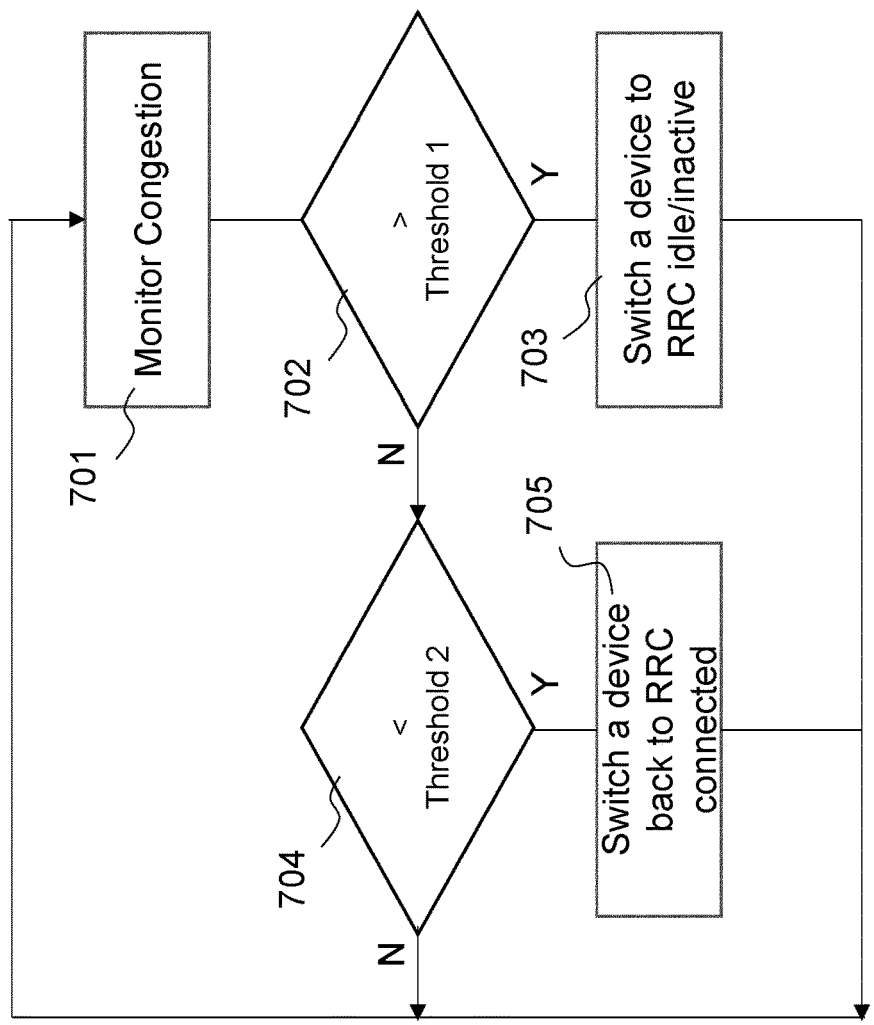

FIG. 7 illustrates a further embodiment of the network function operations. The congestion is monitored, see action 701. When now a (first) threshold has been reached again, see action 702, a device will be ordered to RRC idle or inactive mode, see action 703. When however the first threshold has not been reached a second check is performed if the second threshold has been reached, see action 704. The second threshold being lower than the first threshold. If reached or passed no action is taken as congestion level is still too high. When however not reached then there is room to order a device back to RRC connect mode, see action 705. The two-level thresholds have the advantage that some hysteresis can be built in to avoid frequent mode changes for devices.

Figure 8:
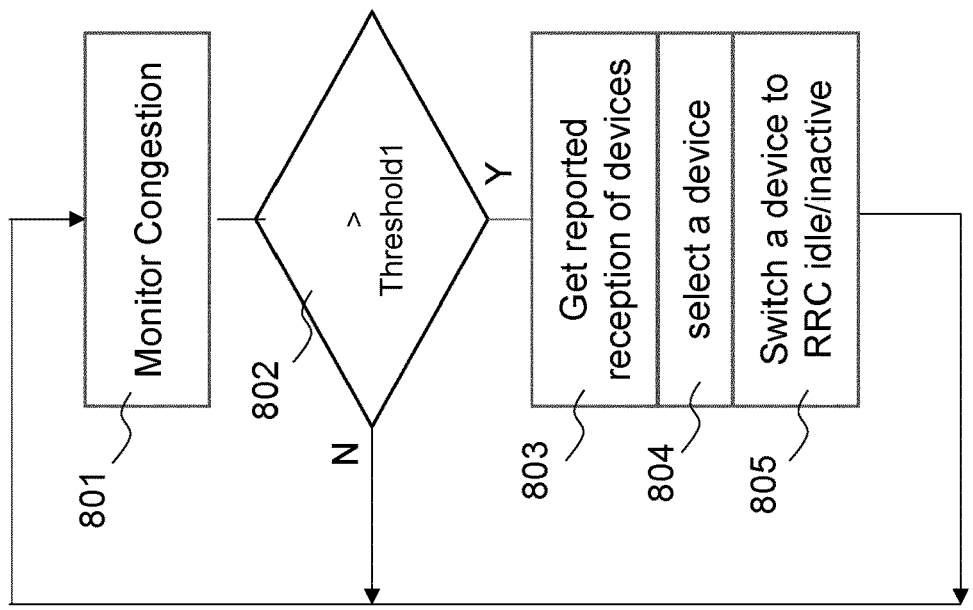

FIG. 8 illustrates a further embodiment of the network function operations. As in FIGS. 6 and 7 the first threshold is checked and when reached or passed the device is order to RRC idle or inactive mode. Difference is now that a dedicated device is selected based on reception quality. Thus, in a continuous loop the congestion situations are monitored against a stated or predefined QoS for the multicast, see action 801. That value is checked in a next step, see action 802. The reception qualities of the different devices are collected, thus, gets reported reception of all devices, see action 803. When the threshold is reached, or passed, one or more devices are selected based on the reported reception quality, see action 804, and are released to the RRC idle or inactive mode, see action 805.

Figure 9:
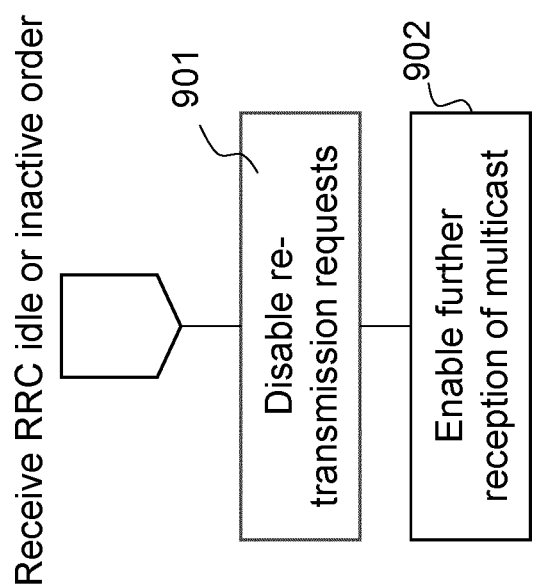

FIG. 9 illustrates the basic operations in the device (UE or the like) 106. After receiving an order to be released or switch to RRC idle or inactive mode the device disabled the HARQ uplink so that no re-transmission requests can be done, see action 901. As a next step the device 106 enables the receiver to continue the reception of the multicast as well as any retransmissions ordered by other devices, see action 902.

Figure 10:
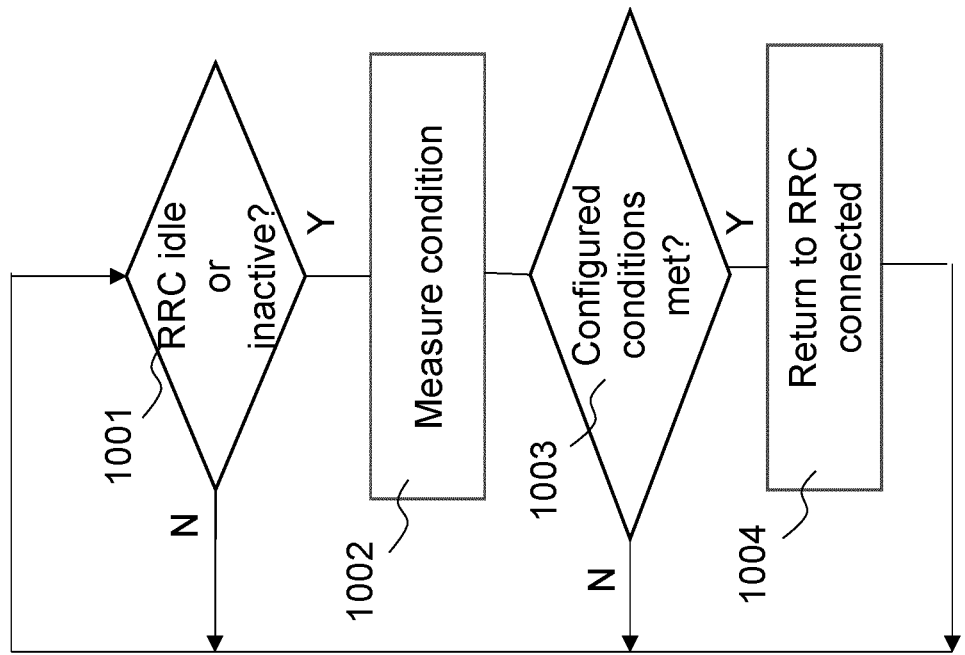
FIGS. 9-10 are flow charts illustrating examples of operations of a device according to some embodiments of the present disclosure.

FIG. 10 illustrates an alternative embodiment of FIG. 9. The device 106 will execute the same flow of as provided by FIG. 9 if an order for RRC idle or inactive mode is received. In this embodiment of the device 106 a second flow is added as indicated by FIG. 10. In this embodiment the RRC configuration comprises a condition that allows the device to return to RRC connected when met.

In a continuous loop the device 106 checks if it is in idle or inactive mode, action 1001. In case that is true the condition of the RRC configuration is measured, action 1002. The value is check against the value provided in the RRC configuration, action 1003. When met then the device 106 switches back to RRC connected, action 1004. The loop continues with RRC idle or inactive which will be negative until the device receives an order to change to idle or inactive as stipulated in FIG. 9.

Additional explanation is provided below.

The fifth generation mobile wireless communication system (5G) or new radio (NR) has been specified in 3GPP. It includes two releases up to now, R-15 and R-16. Only unicast transmission is supported. Since multicast/broadcast transmission is very useful for some applications, e.g. NSPS (Network Security Public Safety), V2X etc, a new WI (work item) is agreed to study broadcast/multicast transmission in R-17 for NR.

The Work Item includes multicast/broadcast support for UEs in RRC Connected and RRC Idle/Inactive.

With UEs in RRC Connected mode or state receiving multicast the network may guarantee a QoS and at the same time achieve a high efficiency in the use of radio resources. With increasing number of UEs there may however be congestion issues.

At the same time using broadcast to Idle/Inactive UEs allows for reception of large number of UEs without providing any feedback but may result in inadequate QoS for some UEs.

In some use case scenarios, such as e.g. Public Safety, there may be a very large number of users within a cell in connected mode. Many of these may need to simultaneously e.g. use Mission Critical Push to Talk (MCPTT) in large group calls, which may involve both voice and video.

The use of Point-to-Multipoint (PTM)-based functionality, where the same downlink signal may reach many users, will no doubt help a lot in such cases and increase the total number of UEs that can be receive an MBS service in a cell with required Quality of Service (QoS), compared to a legacy unicast-only approach.

Although the use of multicast in RRC Connected mode is likely to be adequate in most situations and scenarios it may still happen that congestion occurs where the number of UEs exceed a level where the network can no longer support all UEs with the required QoS. In many cases it is expected that the uplink (UL) may be the limiting factor in such cases, where there is not enough UL capacity to support UE feedback from all RRC Connected UEs.

The network will then have to lower the actual QoS or block some UEs from the service. Neither of these may be acceptable in, e.g., a Mission Critical Push-to-Talk (MCPTT) for Public Safety.

Another aspect of enabling multicast reception of MBS services in RRC Idle/Inactive mode is to monitor/control which UEs are currently receiving the multicast service for efficient configuration provisioning, resource scheduling as well as session management. Note that network knows which UEs is in RRC Inactive mode as it still keeps UE contexts including UE ID (resumeID), but not UEs in RRC Idle mode. It is desired to have an efficient mechanism to allow network to know current multicast UEs in RRC Idle/Inactive mode.

Although the use of multicast with Point-To-Multipoint (PTM) functionality may support many UEs in a cell with required QoS, with increasing number of UEs there will at some point be congestion, e.g. in the uplink, due to UEs sending HARQ feedback or to keep the UE context of all the connected mode UEs.

With the invention a subset of UEs may be released from RRC Connected to RRC Inactive or Idle. The same single multicast transmission can then be received by UEs in all RRC states. QoS can thus be maintained for RRC Connected UEs, whereas some UEs in RRC Inactive/Idle may experience a QoS below the normal QoS threshold, but this may be preferred compared to not receiving at all for these UEs if they are instead blocked from RRC Connected without the reception possibility in Idle/Inactive.

With the invention the network may also move UEs between RRC Connected and RRC Inactive/Idle in a dynamic way, so that UEs with the best link quality for the moment will tend to be moved to RRC Inactive/Idle, whereas UEs in worse conditions are in RRC Connected. When UE link quality in RRC Inactive/Idle passes a threshold they may go back to RRC Connected.

With the invention, the network can efficiently inform RRC Idle/Inactive UEs about the session update such as session stop, service area change, configuration modification, or change in security.

With embodiments herein, the UE in RRC Idle/Inactive can efficiently inform network when it no longer receives an MBS session.

For the congestion case, with too many UEs that wish to receive the MBS service, the network can keep QoS for RRC Connected UEs up to some limit but still allow remaining UEs to receive the service, albeit with a reduced QoS.

The proposed solution also allows the total number of UEs, that receive according to the QoS target, to be higher than with all UEs in RRC Connected only.

Reception of the same multicast in all RRC states to handle congestion

The main mode of multicast operation, e.g. for National Security and Public Safety (NSPS) based Mission Critical Push-To-Talk (MCPTT) is to keep all UEs in RRC Connected state, with Quality of Service (QoS) in line with requirements.

There may nevertheless be cases, in connection with congestion, where this is not possible anymore. One possible method that could be employed by the network is to release some UEs from RRC Connected to RRC Inactive or RRC Idle (RRC Inactive/Idle). These UEs could then keep relevant parts of their RRC Connected configuration and continue to receive the MBS service in RRC Inactive/Idle by receiving the same (i.e. without duplication) G-RNTI-based PDCCH and PDSCH signals that are received by RRC Connected UEs.

All UEs are assumed to have been initially configured while in RRC Connected. If these UEs have started to receive the MBS service in RRC Connected the release to RRC Inactive/Idle would mean that they simply continue to receive the PDSCH scheduling via the G-RNTI-based PDCCH. When the limiting factor for congestion is the UL feedback from RRC Connected UEs, this means that the number of RRC Connected UEs can be kept close to the congestion limit, allowing these UEs full QoS, while still allowing potentially many more UEs to receive the service in a more best-effort way.

The only relevant, but fundamental, difference for the UE and network is that the UE does not provide any uplink (UL) feedback anymore, e.g. HARQ feedback, while in RRC Inactive/Idle. Any HARQ retransmissions are therefore only triggered by feedback from UEs in RRC Connected. There is also the possibility that the network decides to send a retransmission even without any HARQ feedback NACK, when the network knows that there are UEs in RRC Inactive/Idle that also wish to receive the service. It should be noted that also UEs not requesting HARQ retransmission are able to receive such retransmissions by monitoring the PDCCH.

In a cell with many UEs the likelihood is however quite high that such Idle/Inactive UEs can actually receive the MBS transmission. Since the network will know which UEs have been released to Idle/Inactive, but are still interested in receiving the MBS service, the network may take these UEs into account when forming beams, selecting MCS, sending HARQ retransmissions and using PDSCH repetition etc.

During an MBS session, UEs in Inactive/Idle may leave for another cell where the MBS session cannot be provided, e.g., non-MBS supporting or lose its interest in the service, etc. In such cases, the UEs should inform the network for session group management as well as efficient radio resource scheduling. To quickly inform the network, the RRC Idle/Inactive UEs can perform a short random-access procedure with an indication in the resume/setup request (Msg3) and return back to RRC Idle/Inactive without the need for entering full RRC Connected.

In one scenario the network would not take these released UEs into account at all but would only transmit based on fulfilling the QoS target for RRC Connected UEs. The transmission would then be optimized for the RRC Connected UEs and any UEs in RRC Idle/Inactive would receive in a best-effort way. Their QoS can therefore not be guaranteed, which is bad, but one must consider that the alternative is to totally block them. From a Public Safety perspective, it is likely that allowing reception for all UEs, albeit with degraded QoS for some of them, is better than totally blocking some of the UEs, due to the congestion.

Dynamically Managing UEs Between RRC States

In another scenario, the network could dynamically manage UEs and move them between RRC states, based on UE reporting. There could, e.g., be a distinction between RRC Inactive and RRC Idle in the sense that UEs that are released to RRC Inactive will receive a special RRC configuration, upon release, which includes a rule that would trigger them to make a Random Access and go back to RRC Connected when the rule condition is met.

This rule could e.g. be based on an absolute RSRP or SINR threshold, see FIG. 1. Each UE would measure e.g. RSRP or SINR and if the threshold is not passed the UE will silently remain in RRC Inactive/Idle. However, when the threshold is passed a UE in RRC Inactive or Idle will attempt to go back to RRC Connected, so that the network may take its reception conditions into account.

FIG. 4 is a Simplified example distribution of UEs in RRC Connected and RRC Idle/Inactive in a cell based on link quality. In a real network both RRC Connected and UEs may be geographically distributed across the entire cell.

When a fixed MCS is used a fixed absolute threshold could work well, but when the MCS dynamically varies, due to UEs changing positions, also the employed threshold may need to be adjusted so that the threshold is in line with the required RSRP or SINR for the MCS. The threshold could then, alternatively, be based on a relative threshold with respect to the expected required RSRP or SINR to receive the current MCS. The threshold could be UE-specific and provided via RRC configuration. It could alternatively be dynamic, if provided via PDCCH DCI.

The UE may also go to from Idle to Connected when it needs to change cell, so that the actual handover can take place in RRC Connected exactly like other RRC Connected UEs. After the handover the new cell will decide whether the UE will remain in RRC Connected or go back to Inactive or Idle.

At the same time there may be UEs in RRC Connected that have very good link quality and could therefore be moved to RRC Inactive/Idle. In this way the network could dynamically select which UEs are in RRC Connected and which are in RRC Inactive/Idle, based on their individual link quality. Since the transition to RRC Connected is easier and faster when going from RRC Inactive it is normally preferable to move back/forth between RRC Connected and RRC Inactive and not involve RRC Idle in such dynamic changes of RRC state, except when the move to RRC Idle is of a more permanent nature, with respect to the existing MBS session.

Since UEs in RRC Inactive do not cost network resources a larger total amount of UEs could thereby be supported by the network in the cell with an actual QoS that is equal or better than the required QoS. Of course, without the possibility for feedback there is a risk that a UE may face difficulties while in RRC Inactive, but that is countered by the fact that the network may choose UEs to be released to RRC Inactive only if they have a good link.

The trigger level could be adjusted based on actual congestion level in the cell. With only slight overloading of the network, and with few UEs in RRC Idle/Inactive, only those UEs with a very good link quality would typically be selected and the trigger level could be set so that they could go back to RRC Connected with still a big margin before expected QoS problems, i.e. they would not risk very much while being in RRC Idle/Inactive. At the same time, other UEs could easily be found that have very good link quality and which could go to RRC Idle/Inactive instead.

With UEs moving around and having varying link quality the network may dynamically move UEs to/from RRC Inactive/Idle in such a way that the QoS tends to be fulfilled for all UEs being part of this dynamic management.

However, when the network load further increases more UEs will need to be released to RRC Idle/Inactive. Gradually, with more UEs in RRC Idle/Inactive some of them will be closer to the trigger level, so it will happen more frequently that such UEs need to go into RRC Connected.

The larger the overload, the closer to the QoS threshold will the trigger need to be set. Of course, there is a limit where this can no longer continue.

Even with such a dynamic approach the network may come into situations where the total number of UEs is so high that the QoS can no longer be achieved, despite such advanced functionality. The network may then move some UEs semi-permanently into Idle, in a similar way as the RRC Inactive UEs, but with the main difference that these Idle UEs are not configured with the above-mentioned triggers that would allow them to go back to RRC Connected. They will therefore remain in RRC Idle throughout the MBS session, unless the congestion situation is improved and these UEs are paged to come back to RRC Connected. These Idle UEs would otherwise be in the same situation as any other (e.g. non-MBS) Idle UE in the cell.

During a multicast session, while network can set a rule for non-Connected UEs to self-evaluate certain conditions based on e.g., RSRP or SINR to know when to get back to Connected, there are events that lead to session update affecting all UEs in the session group. This could be due to a new cell joining the service area resulting in possible configuration update for UEs in neighboring cells. In another example, when there is any change in encryption of MBS data, such as key-change, UEs in the session group may all be required to be informed about the change. In such cases, network needs to inform not only UEs in Connected state but also UEs in Idle/Inactive state. Informing UEs in Connected state is rather straightforward with dedicated signaling as they have RRC connection. Informing UEs in Idle/Inactive state can be done by, for example, paging (including group-based paging) with an indication to require UEs to get back Connected. Depending on the reason to be moved back to Connected state and network congestion status, the network can keep a UE in Connected or move it back to Idle/Inactive for continuing service reception.

Note that for stop of an MBS session, network needs to inform RRC Idle/Inactive UEs, for example, via group paging or system information signaling. If there are more upcoming session(s) of the same MBS service, the UEs may be required to enter RRC Connected again and join the session(s) from scratch.

HARQ

In legacy unicast NR, HARQ retransmissions may be used, based on UE feedback. This scheme can be reused for multicast. It should however be noted that UEs in RRC Idle/Inactive, while not sending feedback, and therefore not affecting the retransmission, these UEs can still benefit from such HARQ retransmissions, triggered by feedback from other UEs in RRC Connected. These UEs simply continue to monitor the PDCCH for scheduling and will detect any retransmissions in the same way as RRC Connected UEs. Any duplications can also be handled within existing functionality.

The same applies for PDSCH repetitions. UEs in RRC Connected will send ACK/NACK feedback at the end of each PDSCH aggregation. UEs in RRC Idle/Inactive will obviously not do this but can still benefit from the multiple PDSCH repetitions to increase the robustness of the transmission. The UE behavior in RRC Inactive/Idle is therefore the same with respect to PDSCH repetitions as for RRC Connected UEs, with the obvious difference that the UEs in RRC Inactive/Idle do not send HARQ feed back.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 11:
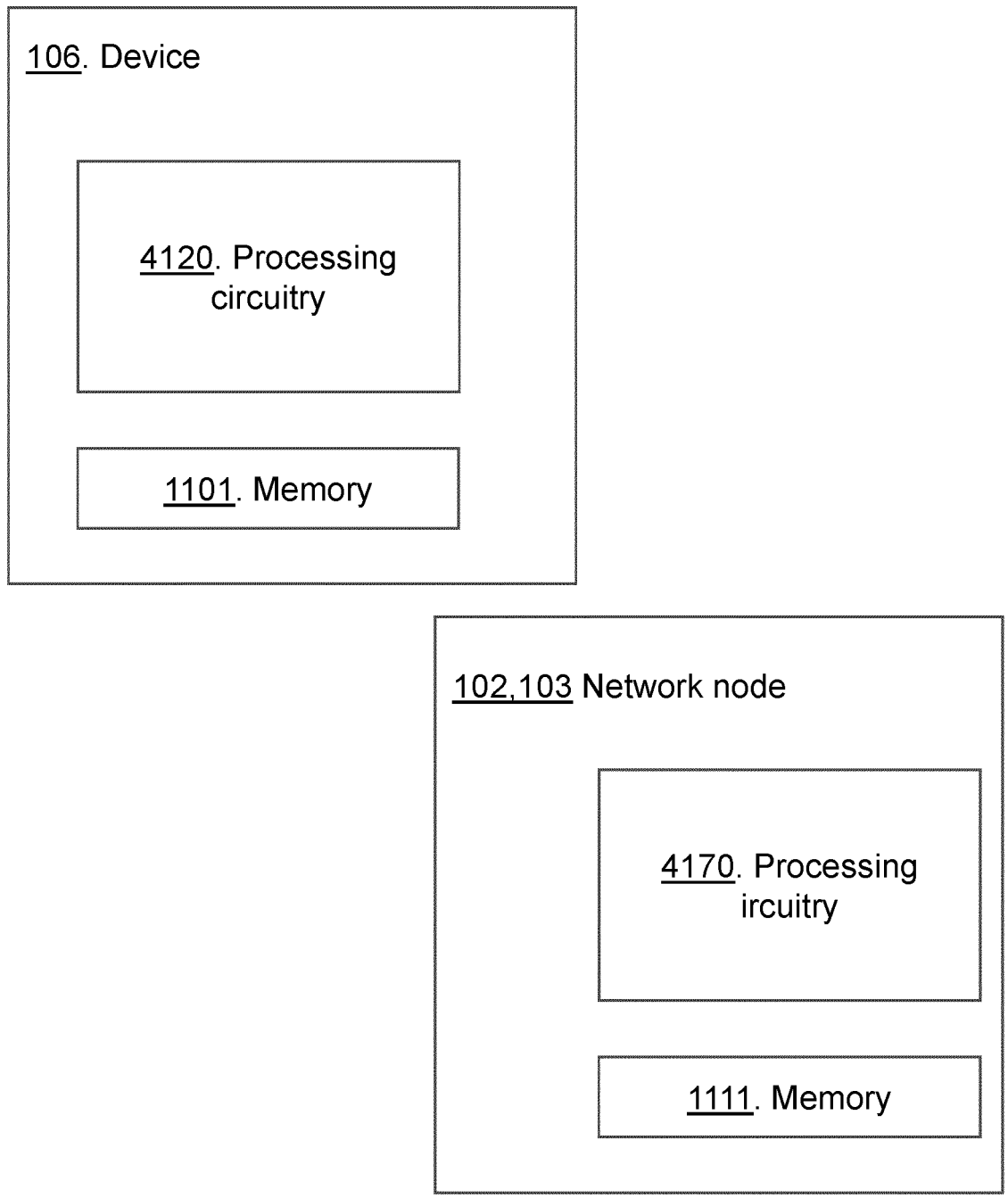
FIG. 11 illustrates block diagrams depicting a device and a network node according to embodiments herein.

FIG. 11 is a block diagram depicting the device 106 and the network node such as the base station 102 or a 5G core NF node 103 for handling communication over the sidelink in the wireless communication network according to embodiments herein.

The device 106 may comprise processing circuitry 4120, e.g. one or more processors, configured to perform the methods herein.

The device 106 and/or the processing circuitry 4120 is configured to, when the device 106 is in the RRC connected mode: receive an order to be released to an RRC idle mode or an RRC inactive mode; maintain a configuration for receiving the multicast transmission, and continue to receive the multicast transmission in the RRC idle mode or the RRC inactive mode.

The device 106 and/or the processing circuitry 4120 may be configured to use the random access procedure to indicate to the telecommunication network that the device is no longer interested in the multicast transmission.

The device 106 and/or the processing circuitry 4120 may be configured to receive a special RRC configuration from the telecommunication network arranging the continuation of reception of the multicast transmission but disabling re-transmission requests when released to the RRC idle mode or the RRC inactive mode.

The special RRC configuration may further comprise the condition, and when the condition is met by the device and the device is in the RRC idle mode or the RRC inactive mode, the device is allowed to return to the RRC connected mode. The condition may be related to link quality of the device.

The device 106 and/or the processing circuitry 4120 may be configured to return to connected mode during a cell change.

The device 106 further comprises a memory 1101. The memory comprises one or more units to be used to store data on, such as indications, modes, requests, configuration, strengths or qualities, orders, indications, requests, commands, timers, applications to perform the methods disclosed herein when being executed, and similar. Thus, the device may comprise the processing circuitry and the memory, said memory comprising instructions executable by said processing circuitry whereby said device is operative to perform the methods herein.

Furthermore, FIG. 11 discloses the network node, such as the base station 102 or the 5G core NF node 103, for, in the telecommunication network, providing the multicast transmission to the group of devices residing in the cell of the telecommunication network.

The network node may comprise processing circuitry 4170, e.g. one or more processors, configured to perform the methods herein.

The network node and/or the processing circuitry 4170 is configured to monitor the congestion level for communication.

The network node and/or the processing circuitry 4170 is configured to, if the congestion level reaches the first threshold, order for at least one device in the RRC connected mode to be released from the RRC connected mode to the RRC idle mode or the RRC inactive mode, thereby disabling the capability of the at least one device to provide one or more re-transmission requests while keeping an ability of the at least one device to further receive the multicast transmission.

The network node and/or the processing circuitry 4170 may be configured to, when the congestion level reaches the second threshold, lower than said first threshold, order to return said at least one device from the RRC idle mode, or the RRC inactive mode, back to the RRC connected mode.

The network node and/or the processing circuitry 4170 may be configured to order one or more duplications, repetitions or re-transmissions without re-transmission requests if at least one device has been released from an RRC connected mode to an RRC idle mode, or an RRC inactive mode.

The network node and/or the processing circuitry 4170 may be configured to provide to said group of devices a special RRC configuration allowing said group of devices to keep receiving said multicast transmission but disabling re-transmission requests. The special RRC configuration may comprise the condition that allows a device of said group of devices to return to the RRC connected mode when said condition is met. The condition may be related to link quality of the at least one device.

The network node and/or the processing circuitry 4170 may be configured to select said at least one device ordered to be released to the RRC idle mode or the RRC inactive mode based on reception quality.

The network node and/or the processing circuitry 4170 may be configured to rotate the order to be released to the RRC idle mode or the RRC inactive mode and back to the RRC connected amongst a number of devices of said group of devices having comparable reception reported.

The network node further comprises a memory 1111. The memory comprises one or more units to be used to store data on, such as indications, modes, requests, configuration, strengths or qualities, orders, indications, requests, commands, timers, applications to perform the methods disclosed herein when being executed, and similar. Thus, the network node may comprise the processing circuitry and the memory, said memory comprising instructions executable by said processing circuitry whereby said network node is operative to perform the methods herein.

Some of the embodiments contemplated herein are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the embodiments to those skilled in the art.

Example embodiments are discussed below.

BELOW ARE SOME EXEMPLARY EMBODIMENTS

Embodiment 1

Method performed by a function in the telecommunication network providing a multicast transmission to a group of devices residing in a cell of the telecommunication network, the method comprising;

Monitoring the congestion level for uplink communication,

If the congestion level reaches a first threshold ordering for at least one device in RRC connected mode to be released or switched from RRC connected to RRC idle mode, there by disabling the device capabilities to provide uplink re-transmission requests while keeping the device ability to further receive the multicast transmission.

Embodiment 2

Method according to embodiment 1 wherein said function, when the congestion level reaches a second threshold, lower then said first threshold, orders to switch or return said at least one device released to RRC idle mode back to RRC connected mode.

Embodiment 3

Method according to embodiment 1 wherein said function orders re-transmissions without requests for re-transmissions if at least one device has been released from RRC connect to RRC idle mode.

Embodiment 4

Method according to embodiment 1 where in the telecommunication network provides said multicast transmission as if said at least one device in RRC idle mode was in RRC connected mode Embodiment 5

Method according to embodiment 1 wherein said at least one device is ordered to be released to RRC inactive instead of RRC idle.

Embodiment 6

Method according to embodiment 1 wherein the network provides to said group of devices a special RRC configuration allowing the devices to keep receiving the multicast stream but disables re-transmission requests.

Embodiment 7

Method according to embodiment 6 wherein said special RRG configuration comprises a condition that allows a device of said group to return to RRC connect when said condition is met.

Embodiment 8

Method according to embodiment 1 or 5 wherein said device ordered to be released to RRC idle or RRC inactive mode is the one device of the group that has the best reception reported.

Embodiment 9

Method according to embodiment 8 wherein the ordering to release to RRC idle or RRC inactive mode and return back to RRC connected mode is rotated amongst a number of devices of said group having comparable reception reported.

Embodiment 10

Method performed by a device, where the device is one of a group of devices residing in a cell of a telecommunication network, the group receiving a multicast transmission, and the device is in the RRC connected mode, the method comprising;
  Receiving an order to be released to the RRC idle mode,
  maintaining the configuration of the multicast transmission,
  continuing to receive the multicast transmission.

Embodiment 11

Method according to method 10 wherein the device, when it is no longer interested in the multicast transmission uses a random access procedure to indicate this to the telecommunication network.

Embodiment 12

Method according to method 10 wherein the device receives an order to be released to RRC inactive mode instead of RRC idle.

Embodiment 13

Method according to embodiment 10 or 12 wherein the device receives a special RRC configuration from the telecommunication network arranging the continuation of reception of the multicast transmission when released to RRC idle or RRC inactive.

Embodiment 14

Method according to embodiment 10 or 12 wherein the special RRC configuration further comprises a condition, and when that condition is met by the device and the device is in RRC idle mode or RRC inactive mode, the device is allowed to return back to RRC connected mode.

Figure 12A:
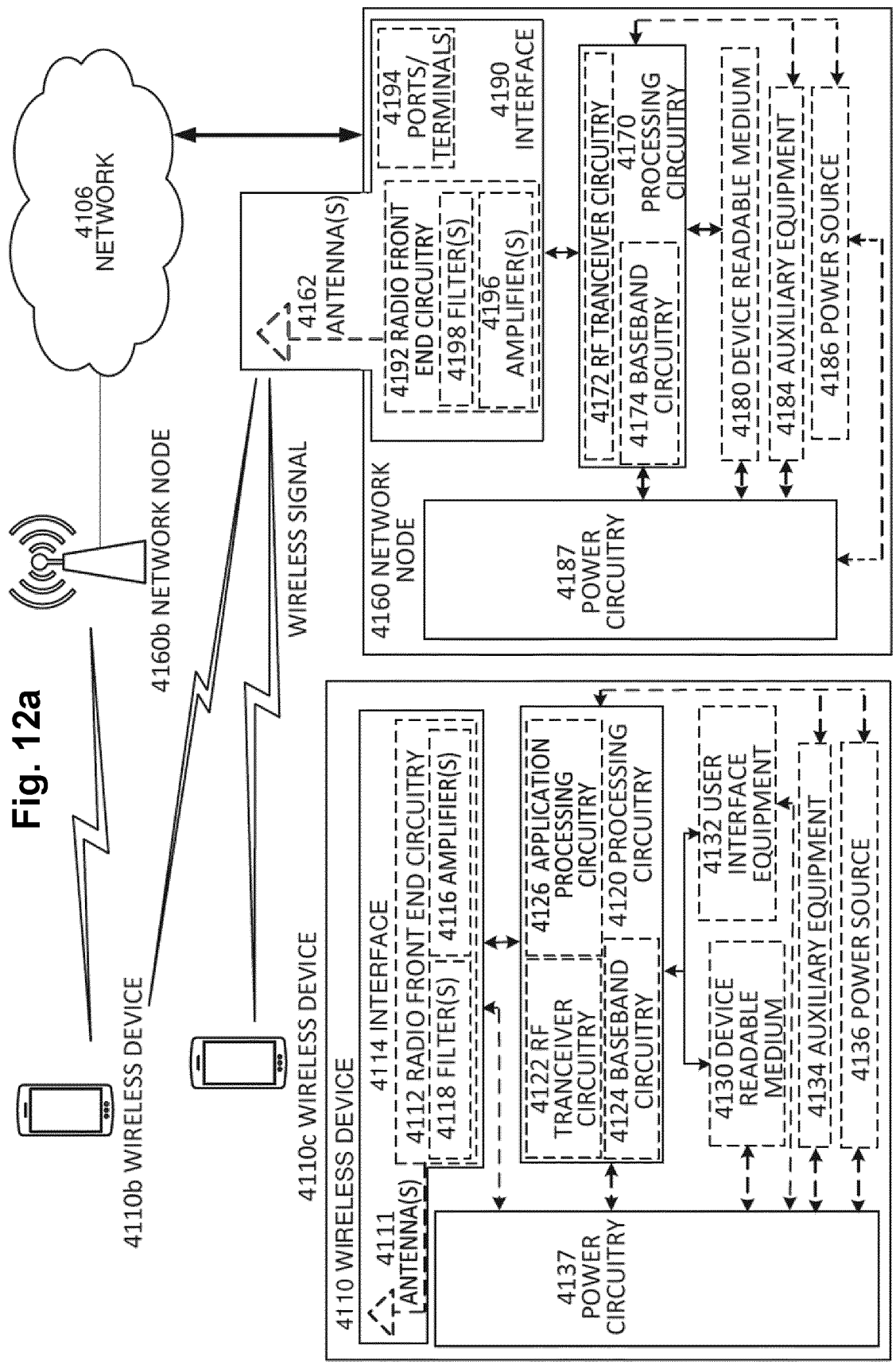
FIG. 12a is a block diagram of a wireless network in accordance with some embodiments.

FIG. 12a illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12a. For simplicity, the wireless network of FIG. 12a only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12a, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 12a may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 12a that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, device or wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 12B:
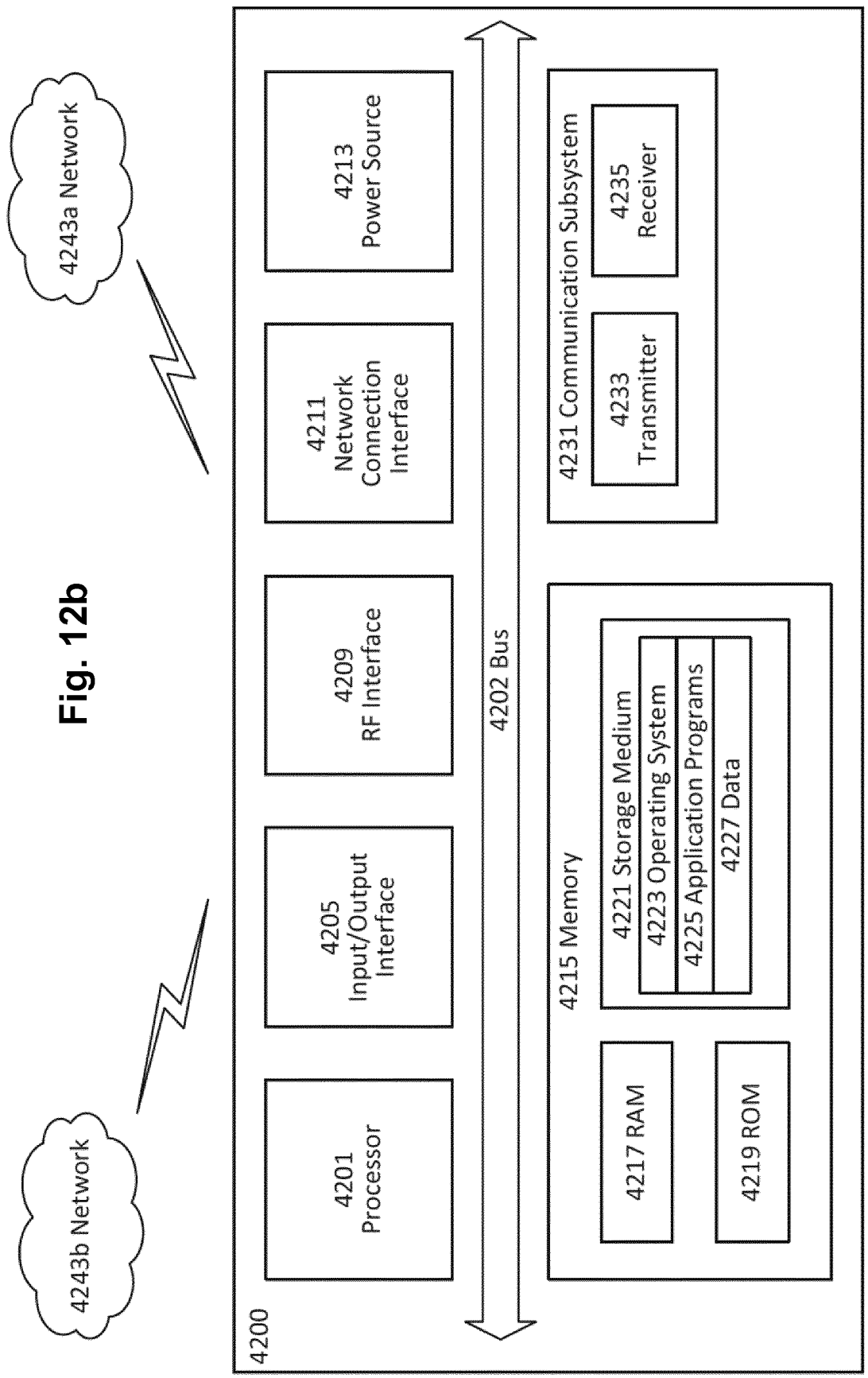
FIG. 12b is a block diagram of a user equipment in accordance with some embodiments.

FIG. 12*b* illustrates a user Equipment in accordance with some embodiments.

FIG. 12*b* illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 12*b*, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12*b* is a UE, the components discussed herein are equally applicable to a WD, and vice-versa.

In FIG. 12*b*, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 12*b*, or only a subset of the components. The level of integration between the components may vary from one UE to another UE. Further, certain UEs may contain multiple instances of a component, such as multiple processors, memories, transceivers, transmitters, receivers, etc.

In FIG. 12*b*, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12b, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 12b, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 13:
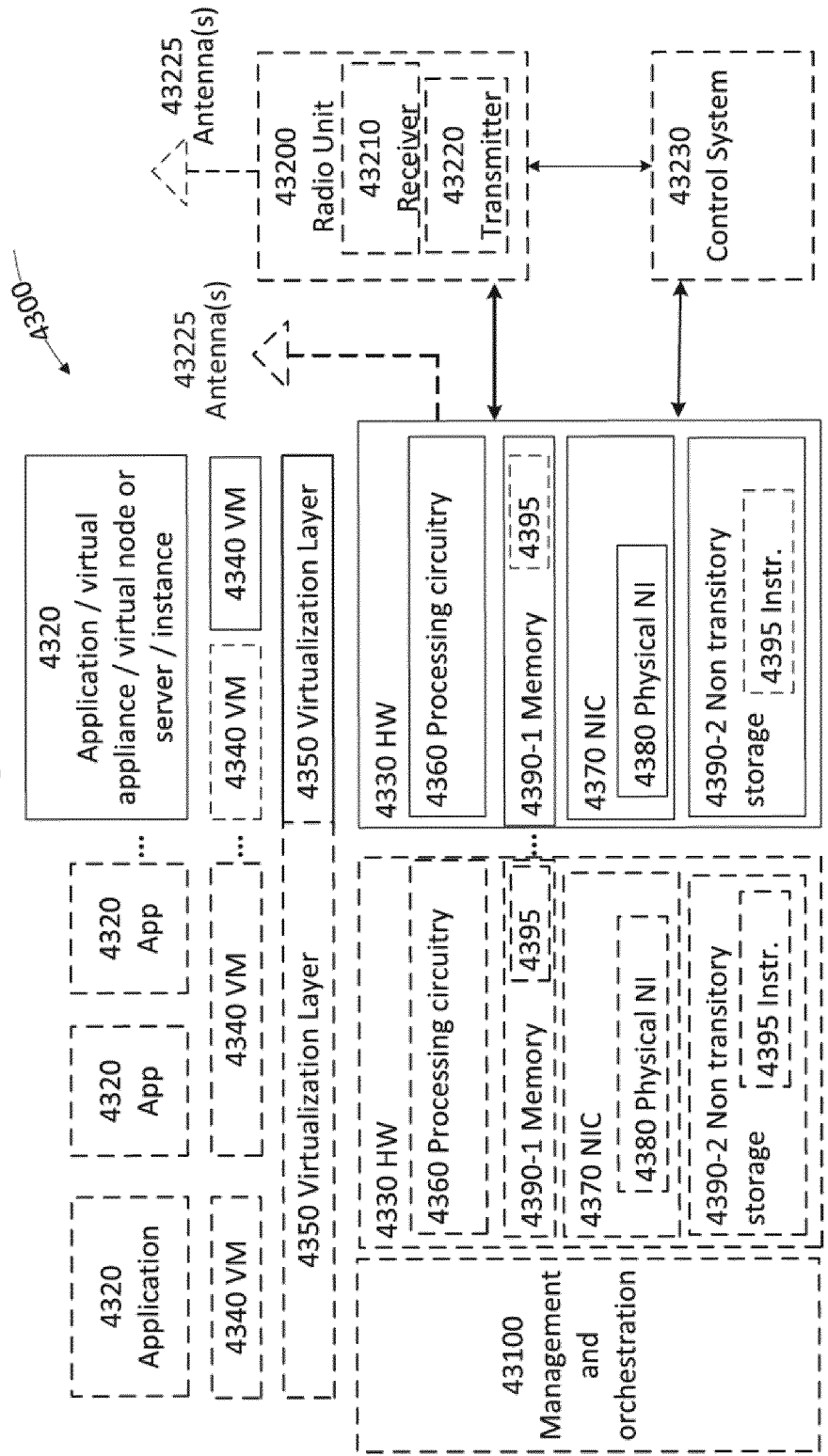
FIG. 13 is a block diagram of a virtualization environment in accordance with some embodiments.

FIG. 13 illustrates a virtualization environment in accordance with some embodiments.

FIG. 13 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 13, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 13.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 14:
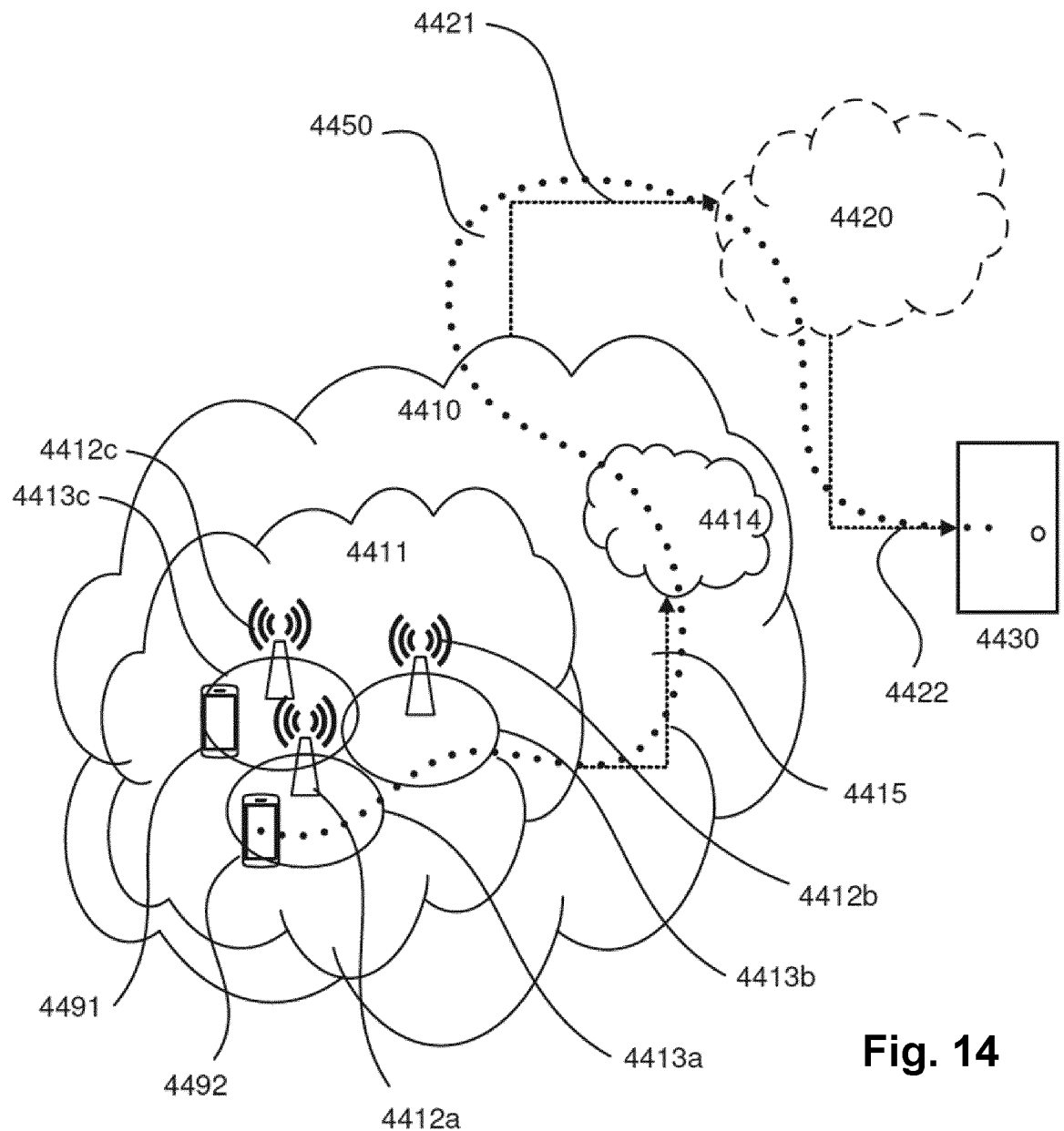
FIG. 14 is a block diagram of a telecommunication network connected via an intermediate network to a host computer in accordance with some embodiments.

FIG. 14 illustrates a telecommunication network connected via an intermediate network to a host computer in accordance with some embodiments.

With reference to FIG. 14, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 14 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 15:
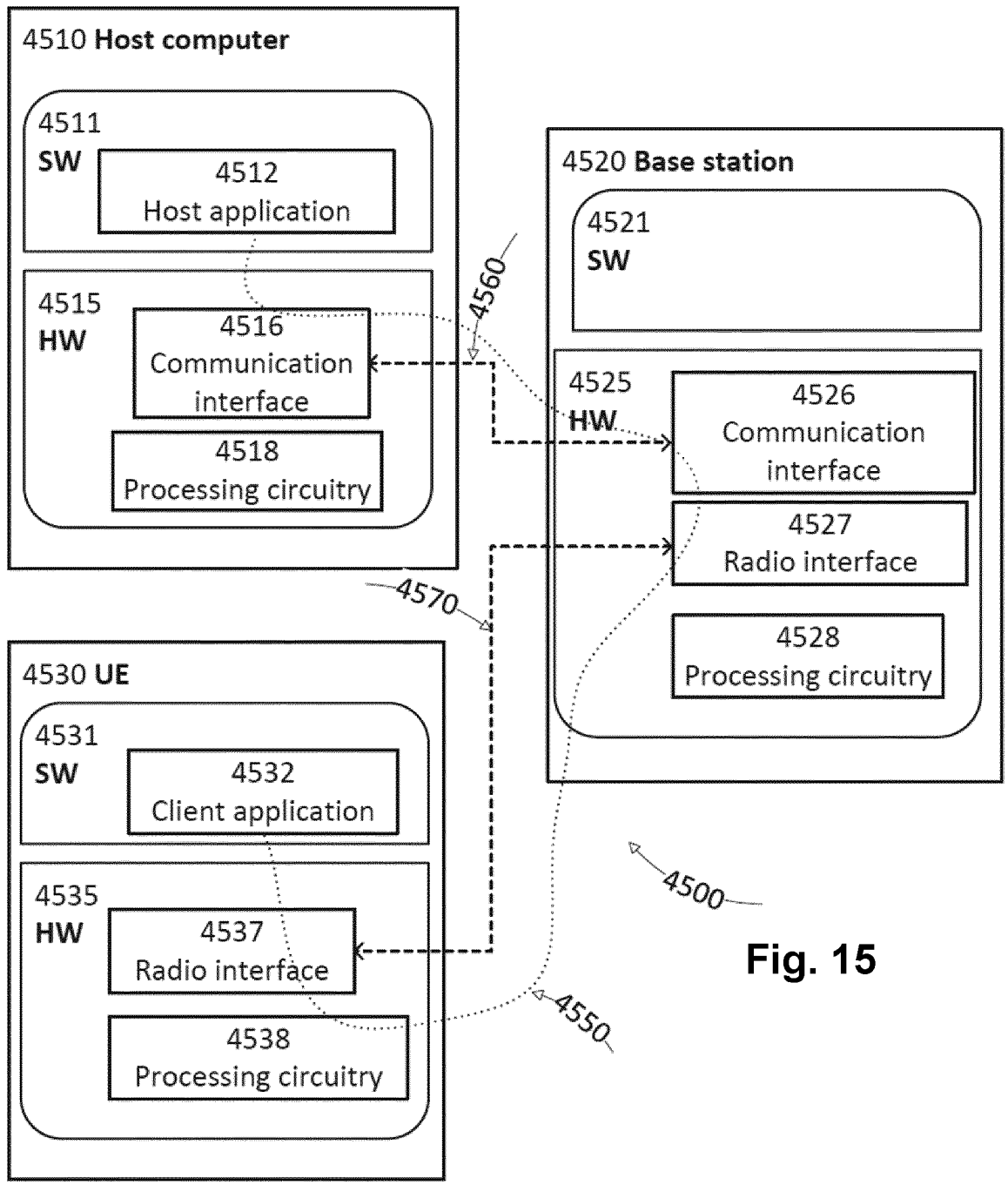
FIG. 15 is a block diagram of a host computer communicating via a base station with a user equipment over a partially wireless connection in accordance with some embodiments.

FIG. 15 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 15) served by base station 4520. Communication interface 4526 may be configured to facilitate connection 4560 to host computer 4510. Connection 4560 may be direct or it may pass through a core network (not shown in FIG. 15) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 15 may be similar or identical to host computer 4430, one of base stations 4412a, 4412b, 4412c and one of UEs 4491, 4492 of FIG. 14, respectively. This is to say, the inner workings of these entities may be as shown in FIG. 15 and independently, the surrounding network topology may be that of FIG. 15.

In FIG. 15, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the QoS for the devices and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 18:
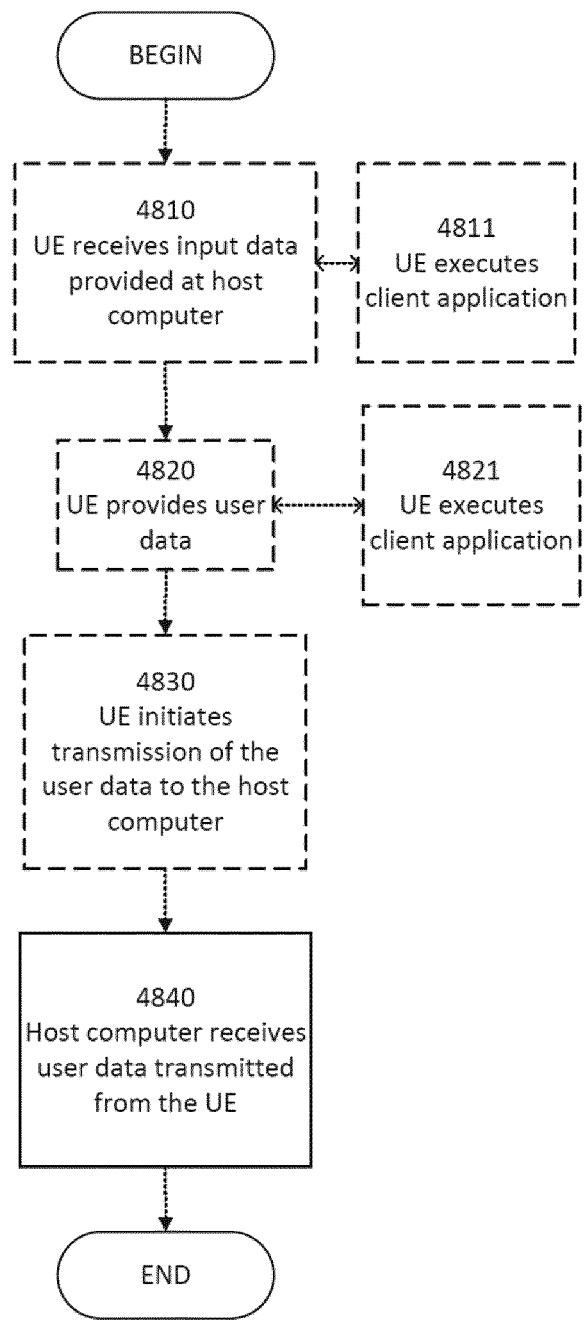
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 19:
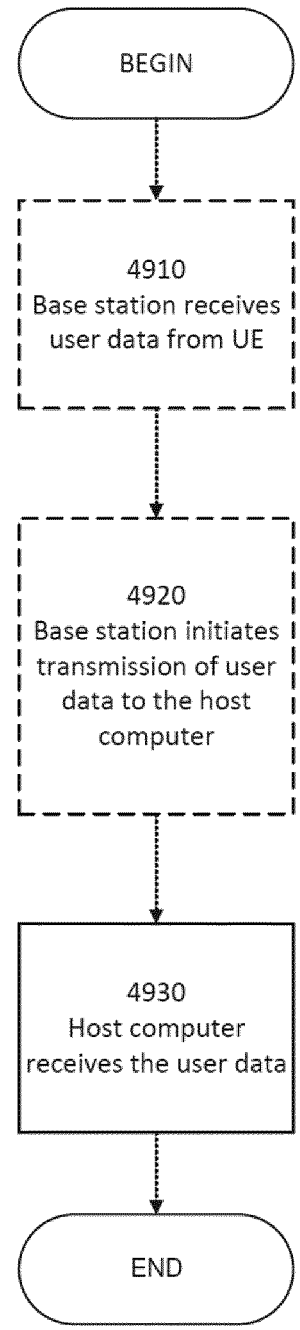
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ACK Acknowledgement
AP Application Protocol
ARQ Automatic Repeat Request
AWGN Additive White Gaussian Noise
BCCH Broadcast Control Channel
BCH Broadcast Channel
BSR Buffer Status Report
BWP Bandwidth Part
CA Carrier Aggregation
CC Carrier Component
CCCH SDU Common Control Channel SDU
CDMA Code Division Multiplexing Access
CE Control Element
CGI Cell Global Identifier
CIR Channel Impulse Response
CP Control Plane
CPICH Common Pilot Channel
CPICH Ec/No CPICH Received energy per chip divided by the power density in the band
CQI Channel Quality Indicator
C-RNTI Cell Radio Network Temporary Identifier
CSI Channel State Information
DC Dual Connectivity
DCCH Dedicated Control Channel
DCI Downlink Control Information
DL Downlink
DM Demodulation
DMRS Demodulation Reference Signal
DRB Data Radio Bearer
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB or (EUTRAN) base station
ePDCCH enhanced Physical Downlink Control Channel
E-RAB EUTRAN Radio Access Bearer
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR or NR base station
GNSS Global Navigation Satellite System
GSM Global System for Mobile communication
GTP-U GPRS Tunneling Protocol—User Plane
HARQ Hybrid Automatic Repeat Request
HO Handover
HSPA High Speed Packet Access
HRPD High Rate Packet Data
IP Internet Protocol
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCG Master Cell Group
MDT Minimization of Drive Tests
MeNB Master eNB
MgNB Master gNB
MIB Master Information Block
MME Mobility Management Entity
MN Master Node
MSC Mobile Switching Center
NACK Negative Acknowledgement
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PCI Physical Cell Identity
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSCell Primary SCell
PSS Primary Synchronization Signal
PUCCH Physical Uplink Control Channel PUSCH Physical Uplink Shared Channel
RACH Random Access Channel
QAM Quadrature Amplitude Modulation
RAN Radio Access Network
RAT Radio Access Technology
RLC Radio Link Control
RLF Radio Link Failure
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SCG Secondary Cell Group
SCTP Stream Control Transmission Protocol
SDU Service Data Unit
SeNB Secondary eNB
SFN System Frame Number
SGW Serving Gateway
SI System Information
SIB System Information Block
SINR Signal to Interference plus Noise Radio
SN Secondary Node
SNR Signal to Noise Ratio
SON Self Optimized Network
SR Scheduling Request
SRB Signaling Radio Bearer
SS Synchronization Signal
SSS Secondary Synchronization Signal
SUL Supplementary uplink
TDD Time Division Duplex
TDOA Time Difference of Arrival
TEID Tunnel Endpoint Identifier
TNL Transport Network Layer
TOA Time of Arrival
TSS Tertiary Synchronization Signal
TTI Transmission Time Interval
UCI Uplink Control Information
UDP User Datagram Protocol
UE User Equipment
UL Uplink
UMTS Universal Mobile Telecommunication System
UP User Plane
USIM Universal Subscriber Identity Module
UTDOA Uplink Time Difference of Arrival
UTRA Universal Terrestrial Radio Access
UTRAN Universal Terrestrial Radio Access Network
URLLC Ultra Reliable Low Latency Communication
WCDMA Wide CDMA
WLAN Wide Local Area Network
X2 Interface between base stations Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node in a telecommunication network providing a multicast transmission to a group of devices residing in a cell of the telecommunication network, the method comprising:
monitoring a congestion level for communication;
if the congestion level reaches a first threshold, ordering for at least one device in a radio resource control, RRC, connected mode to be released from the RRC connected mode to an RRC idle mode or an RRC inactive mode, thereby disabling a capability of the at least one device to provide one or more re-transmission requests while keeping an ability of the at least one device to further receive the multicast transmission; and
when the congestion level reaches a second threshold, lower than said first threshold, ordering to return said at least one device from the RRC idle mode, or the RRC inactive mode, back to the RRC connected mode.

2. The method according to claim 1, further comprising:
ordering one or more duplications, repetitions or re-transmissions without re-transmission requests if at least one device has been released from an RRC connected mode to an RRC idle mode, or an RRC inactive mode.

3. The method according to claim 1, wherein the network node provides to said group of devices a special RRC configuration allowing said group of devices to keep receiving said multicast transmission but disabling re-transmission requests.

4. The method according to claim 3, wherein the special RRC configuration comprises; a condition that allows a device of said group of devices to return to the RRC connected mode when said condition is met.

5. The method according to claim 4, wherein the condition is related to link quality of the at least one device.

6. The method according to any of the claims 1-5, wherein said at least one device ordered to be released to the RRC idle mode or the RRC inactive mode is selected based on reception quality.

7. The method according to the claim 6, wherein ordering to be released to the RRC idle mode or the RRC inactive mode and back to the RRC connected is rotated amongst a number of devices of said group of devices having comparable reception reported.

8. A method performed by a device, where the device is one device out of a group of devices residing in a cell of a telecommunication network, wherein the group of devices is receiving a multicast transmission, and the device is in a radio resource control, RRC, connected mode, the method comprising:
upon a congestion level for communication in the telecommunication network reaching a first threshold, receiving an order to be released to an RRC idle mode or an RRC inactive mode;
maintaining a configuration for receiving the multicast transmission;
continuing to receive the multicast transmission in the RRC idle mode or the RRC inactive mode; and
upon the congestion level for communication in the telecommunication network reaching a second threshold, wherein the second threshold is lower than said first threshold, receiving an order to return said at least one device from the RRC idle mode, or the RRC inactive mode, back to the RRC connected mode.

9. The method according to the claim 8, wherein the device uses a random access procedure to indicate to the telecommunication network that the device is no longer interested in the multicast transmission.

10. The method according to the claim 8, further comprising:
receiving a special RRC configuration from the telecommunication network arranging the continuation of reception of the multicast transmission but disabling re-transmission requests when released to the RRC idle mode or the RRC inactive mode.

11. The method according to the claim 10, wherein the special RRC configuration further comprises:
a condition, and when the condition is met by the device and the device is in the RRC idle mode or the RRC inactive mode, the device is allowed to return to the RRC connected mode.

12. The method according to claim 11, wherein the condition is related to link quality of the device.

13. The method according claim 8, further comprising:
returning to connected mode during a cell change.

14. A network node for, in a telecommunication network, providing a multicast transmission to a group of devices residing in a cell of the telecommunication network, the network node comprising:

a processor; and a memory coupled with the processor;

wherein the network node is configured to:

monitor a congestion level for communication;

if the congestion level reaches a first threshold, order for at least one device in a radio resource control, RRC, connected mode to be released from the RRC connected mode to an RRC idle mode or an RRC inactive mode, thereby disabling a capability of the at least one device to provide one or more re-transmission requests while keeping an ability of the at least one device to further receive the multicast transmission; and when the congestion level reaches a second threshold, lower than said first threshold, order to return said at least one device from the RRC idle mode, or the RRC inactive mode, back to the RRC connected mode.

15. The network node according to claim 14, wherein the network node is further configured to:

order one or more duplications, repetitions or re-transmissions without re-transmission requests if at least one device has been released from an RRC connected mode to an RRC idle mode, or an RRC inactive mode.

16. The network node according to claim 14, wherein the network node is further configured to:

provide to said group of devices a special RRC configuration allowing said group of devices to keep receiving said multicast transmission but disabling re-transmission requests.

17. The network node according to claim 16, wherein the special RRC configuration comprises:

a condition that allows a device of said group of devices to return to the RRC connected mode when said condition is met.

18. The network node according to claim 17, wherein the condition is related to link quality of the at least one device.

19. The network node according to any of the claim 14, wherein the network node is configured to:

select said at least one device ordered to be released to the RRC idle mode or the RRC inactive mode based on reception quality.

20. The network node according to the claim 19, wherein the network node is configured to:

rotate the order to be released to the RRC idle mode or the RRC inactive mode and back to the RRC connected amongst a number of devices of said group of devices having comparable reception reported.

21. A device, the device comprising:

a processor; and a memory coupled with the processor;

wherein the device is configured to:

when the device is in a radio resource control, RRC, connected mode;

upon a congestion level for communication in the telecommunication network reaching a first threshold, receive an order to be released to an RRC idle mode or an RRC inactive mode;

maintain a configuration for receiving the multicast transmission;

continue to receive the multicast transmission in the RRC idle mode or the RRC inactive mode; and upon the congestion level for communication in the telecommunication network reaching a second threshold, wherein the second threshold is lower than said first threshold, receive an order to return said at least one device from the RRC idle mode, or the RRC inactive mode, back to the RRC connected mode.

22. The device according to the claim 21, wherein the device is configured to:

use a random access procedure to indicate to the telecommunication network that the device is no longer interested in the multicast transmission.

23. The device according to the claim 21, wherein the device is further configured to:

receive a special RRC configuration from the telecommunication network arranging the continuation of reception of the multicast transmission but disabling re-transmission requests when released to the RRC idle mode or the RRC inactive mode.

24. The device according to the claim 23, wherein the special RRC configuration further comprises:

a condition, and when the condition is met by the device and the device is in the RRC idle mode or the RRC inactive mode, the device is allowed to return to the RRC connected mode.

25. The device according to claim 24, wherein the condition is related to link quality of the device.

26. The device according to claim 21, wherein the device is configured to: return to connected mode during a cell change.

* * * * *